US007255412B2

(12) United States Patent
Nagashima

(10) Patent No.: US 7,255,412 B2
(45) Date of Patent: Aug. 14, 2007

(54) IMAGE FORMING APPARATUS AND METHOD

(75) Inventor: Kanji Nagashima, Kanagawa (JP)

(73) Assignee: Fujifilm Corporation, Tokyo (JP)

(*) Notice: Subject to any disclaimer, the term of this patent is extended or adjusted under 35 U.S.C. 154(b) by 363 days.

(21) Appl. No.: 10/951,606

(22) Filed: Sep. 29, 2004

(65) Prior Publication Data

US 2005/0104916 A1 May 19, 2005

(30) Foreign Application Priority Data

Sep. 30, 2003 (JP) ............................ 2003-342287

(51) Int. Cl.
*B41J 2/205* (2006.01)
*B41J 2/17* (2006.01)
*G01D 11/00* (2006.01)

(52) U.S. Cl. ........................... 347/15; 347/95; 347/100

(58) Field of Classification Search .................. 347/15, 347/95, 100
See application file for complete search history.

(56) References Cited

U.S. PATENT DOCUMENTS 6,086,193 A 7/2000 Shimada et al.

(Continued)

FOREIGN PATENT DOCUMENTS

JP 09-286125 A 11/1997

(Continued)

OTHER PUBLICATIONS

Japanese Office Action issued on Oct. 13, 2005 in connection with Japanese Application 2004-286024 w/ English Translation; claims priority on Japanese application 2003-342287 on which present U.S. application also claims priority.*

*Primary Examiner*—Stephen Meier
*Assistant Examiner*—Rene Garcia, Jr.
(74) *Attorney, Agent, or Firm*—Birch, Stewart, Kolasch and Birch, LLP

(57) ABSTRACT

The image forming apparatus forms an image on a recording medium by using coloring materials of at least three colors of cyan, magenta and yellow, wherein: at least one of the cyan and magenta color materials is a coloring material of lower density than the yellow; and ink brightness or perception of graininess on the recording medium is substantially the same for each of the three coloring materials, if recording is carried out on the recording medium according to any one condition of: a first condition wherein recording is carried out using substantially the same dot size for each color, at a recording rate of 100%; a second condition wherein recording is carried out using substantially the same dot size for each color, at the same recording rate for each color with respect to the surface area of the recording medium that is to be evaluated, and at an overlap rate of 100%; and a third condition wherein recording is carried out using substantially the same dot size distribution for each color, at the same recording rate for each color with respect to the surface area on the recording medium that is to be evaluated, and at an overlap rate of 100%, where a maximum number of dots recorded onto the recording medium per unit surface area is taken as $N_{max}$, a number of dots actually recorded per unit surface area as r, a sum of a surface area covered by the recorded dots per unit surface area as c, a total surface area of the dots recorded per unit surface area as Ds, and the unit surface area as S, and the following equations are established: a recording rate=$(r/N_{max})\times100(\%)$, a coverage rate=$(c/S)\times100(\%)$, and an overlap rate=$\{Ds/(S\times\text{Coverage rate}/100)\}\times100(\%)=(Ds/c)\times100(\%)$.

9 Claims, 11 Drawing Sheets

U.S. PATENT DOCUMENTS

| | | | | |
|---|---|---|---|---|
| 6,120,129 | A | 9/2000 | Iwasaki et al. | |
| 6,341,841 | B1 | 1/2002 | Shimada et al. | |
| 6,474,799 | B1 | 11/2002 | Shimada et al. | |
| 6,601,938 | B1 | 8/2003 | Iwasaki et al. | |
| 6,637,850 | B2 | 10/2003 | Shimada et al. | |
| 6,824,262 | B2 * | 11/2004 | Kubota et al. | 347/100 |
| 6,843,840 | B2 * | 1/2005 | Kataoka et al. | 106/31.6 |
| 6,880,915 | B2 * | 4/2005 | Shimada | 347/43 |
| 6,890,049 | B2 * | 5/2005 | Shimada et al. | 347/15 |

FOREIGN PATENT DOCUMENTS

| | | | | |
|---|---|---|---|---|
| JP | 10-044475 | A | | 2/1998 |
| JP | 10-211692 | A | | 8/1998 |
| JP | 2001-71539 | A | | 3/2001 |
| JP | 2001071539 | A | * | 3/2001 |

* cited by examiner

IMAGE FORMING APPARATUS AND METHOD

This Nonprovisional application claims priority under 35 U.S.C. 119(a) on Patent Application No(s). 2003-342287 filed in Japan on Sep. 30, 2003, the entire contents of which are hereby incorporated by reference.

BACKGROUND OF THE INVENTION

1. Field of the Invention

The present invention relates to an image forming apparatus and method, and more particularly, to the structure of a recording head unit suitable for an inkjet recording apparatus forming color images by using inks of a plurality of colors, and to a recording control technology for same.

2. Description of the Related Art

When printing a color image, an inkjet printer uses inks of at least three colors, cyan (C), magenta (M), and yellow (Y), and furthermore, it may also form images using black (Bk), light cyan (LC), light magenta (LM), dark yellow (DY) and a special color (SPC), and the like.

In general, in a printer for producing print outputs of high quality (photographic quality), inks of six or more colors, including the addition of the light cyan (LC) and light magenta (LM) described above, are often used in order that the contrast between the grains of the printed dots is not noticeable. In inkjet printers of this kind, generally, the nozzle density in the head is set to the same density for each of the colors. Examples are known wherein document printing speed is emphasized, and Bk nozzles only are provided in greater number and higher density than the other colors, but in this case, all of the colors other than Bk are set to the same nozzle density as each other. More specifically, in general, if the number of colors is increased due to demands for high quality, then the number of nozzles also increases, accordingly.

Furthermore, in a conventional inkjet printer, in order to shorten the printing time, the time interval between ink discharges has been shortened (the discharge frequency has been increased), and the number of ink discharge nozzles in the recording head has been increased. Increase in the discharge frequency has been achieved either by raising the upper limit of the response frequency of the discharge mechanism (the pressurizing devices, such as a piezo element, or the heater), or by replenishing ink more quickly after ink discharge, or the like. Furthermore, increasing the number of discharge nozzles is achieved by improving the head processing and fabrication technology, and increasing miniaturization and density, and even in an inexpensive inkjet printer, the overall number of nozzles can be several thousand.

More specifically, the trend of technological development is moving towards heads of ever larger overall size, due to the multiplying effect of the number of colors and the number of nozzles in response to demands for high quality and speed.

Due to improvements of these kinds, it has been possible to shorten the printing time, but on the other hand, the following types of problems have arisen. More specifically, the increase in the number of nozzles described above leads to problems in that, in addition to raising the cost of the device, the increase in the total number of nozzles, and the fact that the total length of the flow passages inside the head for supplying ink to these respective nozzles becomes longer, give rise to an increased possibility of an ink discharge problem occurring in the head.

This is not limited to an increased probability of simple breakdowns, but rather means that there is an increased possibility of problems such as air bubbles becoming trapped inside the ink flow passages and it becoming impossible to perform normal discharge, or problems which are intrinsic to inkjet systems, such as the ink viscosity rising in the vicinity of the nozzles, and causing discharge failures.

More particularly, in a single pulse type inkjet printer, which, unlike a shuttle scan type printer for printing by scanning an inkjet head back and forth, has a fixed head of a length equal to or greater than the print image and performs printing by conveying printing paper in a direction orthogonal to the longitudinal direction of the head, the number of nozzles per ink color may exceed 10,000, and hence the issue of increased possibility of problems such as those described above is very serious indeed.

Furthermore, if inks of six colors are used in a single pass type inkjet printer, then naturally, the overall size of the head will become very large, and the cost thereof will increase.

In order to deal with the issue of problems of this kind, although it runs counter to improvements aimed at enhancing image quality, if the number of nozzles could be reduced, then the possibility of problems occurring can also be reduced.

In relation to technology for improving image quality in an inkjet recording apparatus, Japanese Patent Application Publication No. 9-286125 proposes a method for recording respective inks at a level of resolution that corresponds to the color appearance. The object of Japanese Patent Application Publication No. 9-286125, as is evident from the statement that "recording is carried out at an image resolution corresponding to the color appearance, for each ink, independently", is to achieve the minimum required image resolution and to reduce the amount of image sent to the printer. Therefore, one pixel is recorded either by ejecting a plurality of droplets of dilute ink, or by means of a plurality of ink dots. However, ejecting droplets at different resolutions in this way is extremely complex, when it comes to carrying out image processing and determining the location of the dots. Furthermore, if a plurality of ink droplets are simply ejected, then since there is a limit on the capacity of the paper to receive ink, this is not a practicable way of achieving high image quality.

Japanese Patent Application Publication No. 10-211692 discloses technology for performing substitute recording using a low-density ink in the event of discharge failure of a high-density ink, in an apparatus having a recording head discharging inks of the same color and different densities. This technology has the object of providing a response for emergency use, in cases of an abnormality, wherein substitute recording is carried out by using a low-density ink, if there has been a discharge failure with a high-density ink, and it is similar to the disclosure in Japanese Patent Application Publication No. 9-286125, in that, if there is a blockage, or if the dark ink has run out, then a plurality of droplets of lighter ink are ejected, or a large droplet of same is ejected.

Japanese Patent Application Publication No. 10-44475 discloses technology for suppressing the volume of ink by raising the concentration of ink having high brightness or low perception of graininess, and performing correction to reducing the recorded ink volume of same, and it states yellow (Y) as the ink to which this is applied. This technology has the object of suppressing the overall ink volume by making the yellow ink darker than the ink of other colors, and controlling the amount of yellow ink used in such a manner that it is reduced, and for this purpose, it stipulates a relationship between the concentrations of the respective inks. Therefore, it does not disclose information of particularly great value with regard to reducing the number of colors (number of nozzles).

SUMMARY OF THE INVENTION

The present invention is contrived in view of such circumstances, and an object thereof is to provide an image forming apparatus and method whereby improving reliability, reducing apparatus size, and reducing overall costs, by reducing the number of types of coloring materials, whilst achieving image recording of high image quality equivalent to photographic quality.

In order to attain the aforementioned object, the present invention is directed to an image forming apparatus which forms an image on a recording medium by using coloring materials of at least three colors of cyan, magenta and yellow, wherein: at least one of the cyan and magenta color materials is a coloring material of lower density than the yellow; and ink brightness or perception of graininess on the recording medium is substantially the same for each of the three coloring materials, if recording is carried out on the recording medium according to any one condition of: a first condition wherein recording is carried out using substantially the same dot size for each color, at a recording rate of 100%; a second condition wherein recording is carried out using substantially the same dot size for each color, at the same recording rate for each color with respect to the surface area of the recording medium that is to be evaluated, and at an overlap rate of 100%; and a third condition wherein recording is carried out using substantially the same dot size distribution for each color, at the same recording rate for each color with respect to the surface area on the recording medium that is to be evaluated, and at an overlap rate of 100%, where a maximum number of dots recorded onto the recording medium per unit surface area is taken as $N_{max}$, a number of dots actually recorded per unit surface area as r, a sum of a surface area covered by the recorded dots per unit surface area as c, a total surface area of the dots recorded per unit surface area as Ds, and the unit surface area as S, and the following equations are established: a recording rate=$(r/N_{max})\times 100(\%)$, a coverage rate=$(c/S)\times 100(\%)$, and an overlap rate=$\{Ds/(S\times \text{Coverage rate}/100)\}\times 100(\%)=(Ds/c)\times 100(\%)$.

According to the present invention, it is possible to substitute use of a high-density coloring material by means of a low-density coloring material of the same color type, for at least one of cyan and magenta, and hence the number of types of coloring materials can be reduced, whilst achieving high-quality image recording. By this means, recording elements corresponding to conventional high-density coloring materials become unnecessary, and hence it is possible to reduce the size and cost of the overall apparatus, to reduce the amount of coloring materials and energy consumed, and to reduce the occurrence rate of recording problems.

Here, "coloring material" indicates a material for imparting a color, and it includes dyes, pigments, or paint including same, ink, color photograph pigments, chromogenic material in a chromogenic layer, or the like.

The present invention is also directed to an image forming apparatus which forms an image on a recording medium by using coloring materials of at least three colors of cyan, magenta and yellow, wherein: at least one of the cyan and magenta color materials is a coloring material of lower density than the yellow; and reflection density on the recording medium of the colors relating to the low-density coloring materials is not more than 1/n (where n is a number not less than 2) of reflection density of the recording made using yellow, if recording is carried out using substantially the same dot size for each of these three coloring materials, at a recording rate of 100%, where a maximum number of dots recorded onto the recording medium per unit surface area is taken as $N_{max}$, a number of dots actually recorded per unit surface area as r, and a recording rate as $r/N_{max}$.

Here, reference to "reflection density" is defined by tricolor density, as used generally, and Status A is used for the spectral sensitivity. This definition is as stated in "ISO 5/3-1984: Photography—Density Measurements—Part 3: Spectral conditions".

By satisfying the condition for the density in the recording results achieved according to the combination of the coloring material and recording medium used, whereby the reflection density of the recording by means of the low-density coloring material is 1/n or less of the reflection density of the recording by means of the yellow coloring material, then it is possible to obtain a density equivalent to that of yellow, by recording the low-density coloring material n times, in a superimposed fashion. Most desirably, in this case, the reflection density of the recording based on the low-density coloring material is ½ of the reflection density of the recording based on the yellow coloring material.

The present invention is also directed to an image forming apparatus which forms an image on a recording medium by using coloring materials of at least three colors of cyan, magenta and yellow, wherein: at least one of the cyan and magenta color materials is a coloring material of lower density than the yellow; and transmission density of the low-density coloring material is not more than 1/n (where n is a number not less than 2) of the transmission density of the yellow coloring material.

Here, reference to "transmission density" is the transmission density per unit thickness, which is defined by tricolor density, as used generally, and Status A is used for the spectral sensitivity. This definition is as stated in "ISO 5/3-1984: Photography—Density Measurements—Part 3: Spectral conditions".

By setting the transmission density of the low-density coloring material used to be 1/n or less of the transmission density of the yellow coloring material, then it is possible to obtain a density equivalent to that of yellow, by recording the low-density coloring material n times, in a superimposed fashion. Furthermore, in this case, desirably, the transmission density of the low-density coloring material is ½ of the transmission density of the yellow coloring material.

The present invention is also directed to an image forming apparatus which forms an image on a recording medium by using coloring materials of at least three colors of cyan, magenta and yellow, wherein: at least one of the cyan and magenta color materials is a coloring material of lower density than the yellow; and recording density on the recording medium by means of the low-density coloring material is not more than 0.9 in terms of the reflection density, and recording density on the recording medium by means of the yellow coloring material is not less than 1.8 in terms of the reflection density, if the recording is carried out for the respective three coloring materials independently, at a coverage rate of approximately 100%, and the respective dots are distributed uniformly in such a manner that the recording rate and the overlap rate respectively assume substantially minimum values, where a maximum number of dots recorded onto the recording medium per unit surface area is taken as $N_{max}$, a number of dots actually recorded per unit surface area as r, a sum of a surface area covered by the recorded dots per unit surface area as c, a total surface area of the dots recorded per unit surface area as Ds, and the unit surface area as S, and the following equations are established: a recording rate=$(r/N_{max})\times100(\%)$, a coverage rate=$(c/S)\times100(\%)$, and an overlap rate=$\{Ds/(S\times\text{Coverage rate}/100)\}\times100(\%)=(Ds/c)\times100(\%)$.

By setting the absolute densities of the recording results achieved according to the combination of coloring materials and recording medium used in such a manner that the reflection density of the recording by means of the low-density coloring material is 0.9 or less, and the reflection density of the recording by means of the yellow coloring material is 1.8 or above, then high quality images of photographic quality can be obtained.

Preferably, the above-described image forming apparatus comprises: a cyan recording head which has a plurality of cyan recording elements for forming dots of cyan on the recording medium; a magenta recording head which has a plurality of magenta recording elements for forming dots of magenta on the recording medium; a yellow recording head which has a plurality of yellow recording elements for forming dots of yellow on the recording medium; and a recording control device which controls recording in such a manner that recording pixels of high density of the same color are formed, by recording a plurality of superimposed dots of the low density, by means of at least one of the recording heads corresponding to the low-density coloring material, of the cyan recording head and the magenta recording head.

According to this mode, it is possible to substitute the use of a coloring material of high density, by means of superimposed recording of a low-density coloring material of the same color type.

Preferably, the recording control device has a control function for recording a plurality of dots using the low-density coloring material, at substantially the same position on the recording medium.

Preferably, the recording control device has a control function for recording a plurality of dots using the the low-density coloring material, at positions on the recording medium in which the plurality of dots overlap mutually by ½ or more of the dot diameter.

Preferably, the low-density coloring material is an ink; and the recording control device has a control function for the low-density ink whereby, before an ink droplet previously deposited onto the recording medium has been completely absorbed into the recording medium, or before the ink droplet previously deposited onto the recording medium has completely solidified on the recording medium, a subsequent droplet of ink of the same color is deposited onto a position making contact with a range of a liquid state of the previously deposited ink on the recording medium.

Before a previously deposited ink droplet is completely absorbed into the recording medium, a subsequent ink droplet is deposited, and by means of the ink droplets making contact with each other, they are drawn together due to surface tension. By this means, it is possible to distribute the ink in a more concentrated manner, compared to a case where the subsequent ink droplet is deposited after a time interval (after the previously deposited ink droplet has been absorbed completely).

Preferably, a drive frequency of the recording elements in at least one recording head corresponding to the low-density coloring material is two or more times a drive frequency of the yellow recording elements. By means of this mode, it is possible to record a plurality of dots of low-density coloring material, at the same position or proximate positions.

Preferably, the ink used as the coloring material is one of a UV-curable ink, a resin dispersion ink, and a pigment ink. When recording a plurality of dots of low-density ink (thin ink) in a superimposed fashion, it is necessary to prevent the occurrence of stains, by taking account of the capacity of the recording medium to absorb ink, and the like. Inks, such as UV-curable ink, resin dispersion ink or pigment ink, are suitable for the present invention since they have properties which make staining relatively unlikely to occur, even if the ink volume used is large.

Preferably, the image forming apparatus comprises a full line recording head wherein a plurality of recording elements for forming respective dots of cyan, magenta and yellow are arranged through a length corresponding to an entire width of the recording medium.

In a single pass type inkjet recording apparatus using a full line recording head having a page-wide recording width, since the number of recording elements (the number of nozzles in the case of an inkjet recording apparatus) is large, there is surplus capacity in the head drive frequency compared to a shuttle scan type head, provided that the number of prints which can be printed in a unit time is the same, and hence increase in the above-described frequency can be achieved readily.

Moreover, if applied to a high-density recording head, and more particularly, to a long, full line recording head wherein a plurality of recording elements are arranged, it is possible substantially to reduce the total number of recording elements, and hence an extremely large beneficial effect is obtained.

A "full line recording head" is usually disposed following a direction that is orthogonal to the relative direction of conveyance of the recording medium (direction of relative movement), but modes may also be adopted wherein the recording head is disposed following an oblique direction that forms a prescribed angle with respect to the direction orthogonal to the direction of relative movement. Furthermore, the arrangement of the recording elements in the recording head is not limited to being a single line type arrangement, and a matrix arrangement comprising a plurality of rows may also be adopted. Moreover, a mode may also be adopted wherein a row of recording elements corresponding to the full width of the recording paper is constituted by combining a plurality of short dimension recording head units having recording element rows which do not reach a length corresponding to the full width of the recording medium.

"Recording medium" indicates a medium on which an image is recorded by means of the action of the recording head (this medium may also be called a print medium, image forming medium, image receiving medium, or the like), and this term includes various types of media, of all materials and sizes, such as continuous paper, cut paper, sealed paper, resin sheets, such as OHP sheets, film, cloth, a printed circuit board whereon a wiring pattern, or the like, is formed by means of an inkjet recording apparatus, and other materials. In the present specification, the term "printing" indicates the concept of forming images in a broad sense, including text.

The movement device (conveyance device) for causing the recording medium and the recording head to move relative to each other may include a mode where the recording medium is conveyed with respect to a stationary (fixed) recording head, or a mode where a recording head is moved with respect to a stationary recording medium, or a mode where both the recording head and the recording medium are moved.

The present invention also provides methods for achieving the aforementioned objects. More specifically, the present invention is also directed to an image forming method for forming an image on a recording medium by using coloring materials of at least three colors of cyan, magenta and yellow, the method comprising the steps of: using a coloring material of lower density than the yellow for at least one of the cyan and magenta color materials; and making ink brightness or perception of graininess on the recording medium substantially the same for each of the three coloring materials, if recording is carried out on the recording medium according to any one condition of: a first condition wherein recording is carried out using substantially the same dot size for each color, at a recording rate of 100%; a second condition wherein recording is carried out using substantially the same dot size for each color, at the same recording rate for each color with respect to a surface area of the recording medium that is to be evaluated, and at an overlap rate of 100%; and a third condition wherein recording is carried out using substantially the same dot size distribution for each color, at the same recording rate for each color with respect to the surface area of the recording medium that is to be evaluated, and at an overlap rate of 100%, where a maximum number of dots recorded onto the recording medium per unit surface area is taken as $N_{max}$, a number of dots actually recorded per unit surface area as r, a sum of a surface area covered by the recorded dots per unit surface area as c, a total surface area of the dots recorded per unit surface area as Ds, and the unit surface area as S, and the following equations are established: a recording rate=$(r/N_{max})\times100(\%)$, a coverage rate=$(c/S)\times100(\%)$, and an overlap rate=$\{Ds/(S\times\text{Coverage rate}/100)\}\times100(\%)=(Ds/c)\times100(\%)$.

The present invention is also directed to an image forming method for forming an image on a recording medium by using coloring materials of at least three colors of cyan, magenta and yellow, the method comprising the steps of: using a coloring material of lower density than the yellow for at least one of the cyan and magenta color materials; and setting reflection density on the recording medium of the colors relating to the low-density coloring materials to be not more than 1/n (where n is a number not less than 2) of reflection density of the recording made using yellow, if recording is carried out using substantially the same dot size for each of these three coloring materials, at a recording rate of 100%, where a maximum number of dots recorded onto the recording medium per unit surface area is taken as $N_{max}$, a number of dots actually recorded per unit surface area as r, and a recording rate as $r/N_{max}$.

The present invention is also directed to an image forming method for forming an image on a recording medium by using coloring materials of at least three colors of cyan, magenta and yellow, the method comprising the steps of: using a coloring material of lower density than the yellow for at least one of the cyan and magenta color materials; and setting transmission density of the low-density coloring material to be not more than 1/n (where n is a number not less than 2) of the transmission density of the yellow coloring material.

The present invention is also directed to an image forming method for forming an image on a recording medium by using coloring materials of at least three colors of cyan, magenta and yellow, the method comprising the steps of: using a coloring material of lower density than the yellow for at least one of the cyan and magenta color materials; and setting recording density on the recording medium by means of the low-density coloring material to be not more than 0.9 in terms of the reflection density, and setting recording density on the recording medium by means of the yellow coloring material to be not less than 1.8 in terms of the reflection density, if the recording is carried out for the respective three coloring materials independently, at a coverage rate of approximately 100%, and the respective dots are distributed uniformly in such a manner that the recording rate and the overlap rate respectively assume substantially minimum values, where a maximum number of dots recorded onto the recording medium per unit surface area is taken as $N_{max}$, a number of dots actually recorded per unit surface area as r, a sum of a surface area covered by the recorded dots per unit surface area as c, a total surface area of the dots recorded per unit surface area as Ds, and the unit surface area as S, and the following equations are established: a recording rate=$(r/N_{max})\times100(\%)$, a coverage rate=$(c/S)\times100(\%)$, and an overlap rate=$\{Ds/(S\times\text{Coverage rate}/100)\}\times100(\%)=(Ds/c)\times100(\%)$.

According to the present invention, it is possible to substitute recording using a high-density coloring material by means of a low-density coloring material of the same color type, for at least one of cyan and magenta, and hence the number of types of coloring materials can be reduced, whilst achieving high-quality image recording. By this means, recording elements corresponding to conventional high-density coloring materials become unnecessary, and hence the number of head units can be reduced, thus making it possible, in turn, to reduce the size and cost of the overall apparatus, to improve reliability, and the like, and to obtain prints of high quality (high resolution and high tonal graduation) equivalent to photographic quality.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

General Configuration of an Inkjet Recording Apparatus (Printer)

Figure 1:
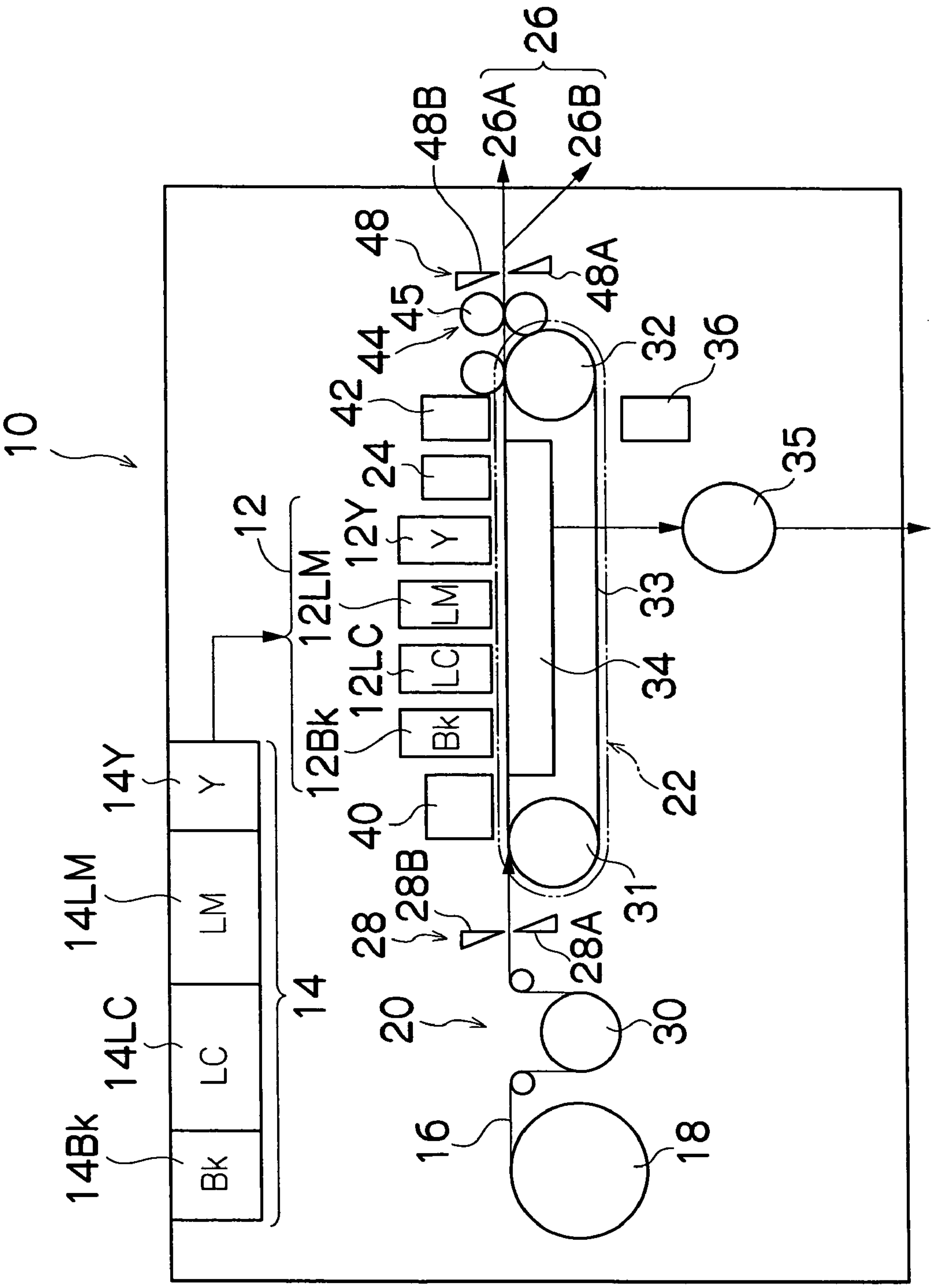
FIG. 1 is a general schematic drawing of an inkjet recording apparatus according to an embodiment of the present invention.

FIG. 1 is a general schematic drawing of an inkjet recording apparatus according to an embodiment of the present invention. As shown in FIG. 1, the inkjet recording apparatus 10 comprises: a printing unit 12 having a plurality of print heads 12Bk, 12LC, 12LM, and 12Y for ink colors of black (Bk), light cyan (LC), light magenta (LM), and yellow (Y), respectively; an ink storing and loading unit 14 for storing inks of Bk, LC, LM and Y to be supplied to the print heads 12Bk, 12LC, 12LM, and 12Y; a paper supply unit 18 for supplying recording paper 16; a decurling unit 20 for removing curl in the recording paper 16; a suction belt conveyance unit 22 disposed facing the nozzle face (ink-droplet ejection face) of the print unit 12, for conveying the recording paper 16 while keeping the recording paper 16 flat; a print determination unit 24 for reading the printed result produced by the printing unit 12; and a paper output unit 26 for outputting image-printed recording paper (printed matter) to the exterior.

In FIG. 1, a single magazine for rolled paper (continuous paper) is shown as an example of the paper supply unit 18; however, a plurality of magazines with paper differences such as paper width and quality may be jointly provided. Moreover, paper may be supplied with a cassette that contains cut paper loaded in layers and that is used jointly or in lieu of a magazine for rolled paper.

In the case of a configuration in which a plurality of types of recording paper can be used, it is preferable that a information recording medium such as a bar code and a wireless tag containing information about the type of paper is attached to the magazine, and by reading the information contained in the information recording medium with a predetermined reading device, the type of paper to be used is automatically determined, and ink-droplet ejection is controlled so that the ink-droplets are ejected in an appropriate manner in accordance with the type of paper.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite from the curl direction in the magazine. The heating temperature at this time is preferably controlled so that the recording paper 16 has a curl in which the surface on which the print is to be made is slightly round outward.

In the case of the configuration in which roll paper is used, a cutter (first cutter) 28 is provided as shown in FIG. 1, and the continuous paper is cut into a desired size by the cutter 28. The cutter 28 has a stationary blade 28A, whose length is not less than the width of the conveyor pathway of the recording paper 16, and a round blade 28B, which moves along the stationary blade 28A. The stationary blade 28A is disposed on the reverse side of the printed surface of the recording paper 16, and the round blade 28B is disposed on the printed surface side across the conveyor pathway. When cut paper is used, the cutter 28 is not required.

The decurled and cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24 forms a horizontal plane (flat plane).

The belt 33 has a width that is greater than the width of the recording paper 16, and a plurality of suction apertures (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as shown in FIG. 1; and the suction chamber 34 provides suction with a fan 35 to generate a negative pressure, and the recording paper 16 is held on the belt 33 by suction.

The belt 33 is driven in the clockwise direction in FIG. 1 by the motive force of a motor (not shown in FIG. 1, but shown as a motor 88 in FIG. 7) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not depicted, examples thereof include a configuration in which the belt 33 is nipped with a cleaning roller such as a brush roller and a water absorbent roller, an air blow configuration in which clean air is blown onto the belt 33, or a combination of these. In the case of the configuration in which the belt 33 is nipped with the cleaning roller, it is preferable to make the line velocity of the cleaning roller different than that of the belt 33 to improve the cleaning effect.

The inkjet recording apparatus 10 can comprise a roller nip conveyance mechanism, in which the recording paper 16 is pinched and conveyed with nip rollers, instead of the suction belt conveyance unit 22. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed on the upstream side of the printing unit 12 in the conveyance pathway formed by the suction belt conveyance unit 22. The heating fan 40 blows heated air onto the recording paper 16 to heat the recording paper 16 immediately before printing so that the ink deposited on the recording paper 16 dries more easily.

Figure 2:
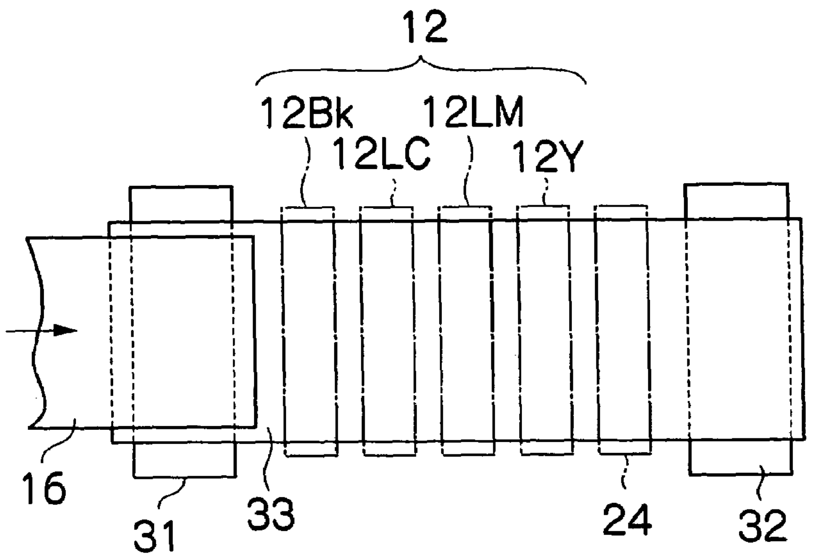
FIG. 2 is a plan view of principal components of an area around a printing unit of the inkjet recording apparatus in FIG. 1.

As shown in FIG. 2, the printing unit 12 forms a so-called full-line head in which a line head having a length that corresponds to the maximum paper width is disposed in the main scanning direction perpendicular to the delivering direction of the recording paper 16 (hereinafter referred to as the paper conveyance direction) represented by the arrow in FIG. 2, which is substantially perpendicular to a width direction of the recording paper 16. A specific structural example is described later with reference to FIGS. 3A to 5. Each of the print heads 12Bk, 12LC, 12LM, and 12Y is composed of a line head, in which a plurality of ink-droplet ejection apertures (nozzles) are arranged along a length that exceeds at least one side of the maximum-size recording paper 16 intended for use in the inkjet recording apparatus 10, as shown in FIG. 2.

The print heads 12Bk, 12LC, 12LM, and 12Y are arranged in this order from the upstream side along the paper conveyance direction. A color print can be formed on the recording paper 16 by ejecting the inks from the print heads 12Bk, 12LC, 12LM, and 12Y, respectively, onto the recording paper 16 while conveying the recording paper 16.

The print unit 12, in which the full-line heads covering the entire width of the paper are thus provided for the respective ink colors, can record an image over the entire surface of the recording paper 16 by performing the action of moving the recording paper 16 and the print unit 12 relatively to each other in the sub-scanning direction just once (i.e., with a single sub-scan). Higher-speed printing is thereby made possible and productivity can be improved in comparison with a shuttle type head configuration in which a print head reciprocates in the main scanning direction.

In the present embodiment, light cyan (LC) and light magenta (LM) are used instead of cyan and magenta among standard colors of cyan (C), magenta (M) and yellow (Y), along with black (Bk). In other words, the four colors of Bk, LC, LM and Y are used in the present embodiment. In implementation of the present invention, however, black is dispensable.

As shown in FIG. 1, the ink storing and loading unit 14 has tanks for storing the inks of Bk, C, M and Y to be supplied to the print heads 12Bk, 12LC, 12LM, and 12Y, and the tanks are connected to the print heads 12Bk, 12LC, 12LM, and 12Y through channels (not shown), respectively. The ink storing and loading unit 14 has a warning device (e.g., a display device, an alarm sound generator) for warning when the remaining amount of any ink is low, and has a mechanism for preventing loading errors among the colors.

In the present embodiment, the discharging amount of each of the LC ink and the LM ink should be larger than those of other color inks, and it is then preferable that the tanks for the LC ink and the LM ink be larger than those of other inks.

The print determination unit 24 has an image sensor for capturing an image of the ink-droplet deposition result of the print unit 12, and functions as a device to check for ejection defects such as clogs of the nozzles in the print unit 12 from the ink-droplet deposition results evaluated by the image sensor. The print determination unit 24 is configured with at least a line sensor or area sensor having rows of photoelectric transducing elements with a width that is greater than the ink-droplet ejection width (image recording width) of the print heads 12Bk, 12LC, 12LM, and 12Y.

The print determination unit 24 reads a test pattern printed with the print heads 12Bk, 12LC, 12LM, and 12Y for the respective colors, and the ejection of each head is determined. The ejection determination includes the presence of the ejection, measurement of the dot size, and measurement of the dot deposition position.

The post-drying unit 42 is disposed following the print determination unit 24. The post-drying unit 42 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

The heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are preferably outputted separately. In the inkjet recording apparatus 10, a sorting device (not shown) is provided for switching the outputting pathway in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown in FIG. 1, the paper output unit 26A for the target prints is provided with a sorter for collecting prints according to print orders. Moreover, although not shown in FIG. 1, the paper output unit 26A for the target prints is further provided with a paper reversing and conveying unit, which reverses the recording paper having been printed and conveys the reversed paper to the position between the first cutter 28 and the suction belt conveyance unit 22 in order to perform both sides printing on the recording paper. In this case, it is also possible to perform printing again by similarly conveying the paper without reversing it so as to raise the recording density of the LC ink and the LM ink.

Structure of the Print Heads

Next, the structure of the print heads is described. The print heads 12Bk, 12LC, 12LM and 12Y have the same structure, and a reference numeral 50 is hereinafter designated to any of the print heads 12Bk, 12LC, 12LM and 12Y.

Figure 3A:
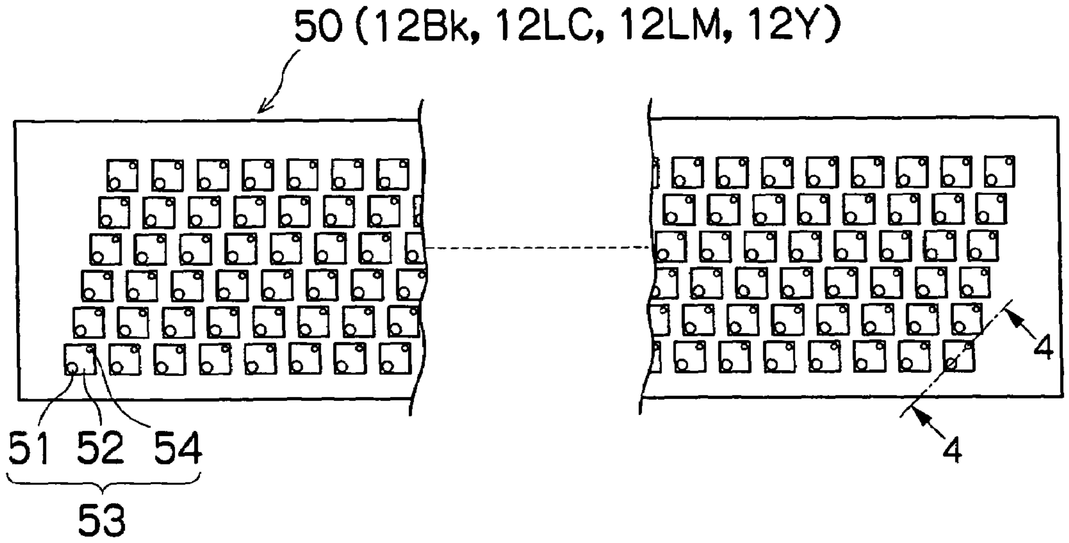
FIG. 3A is a perspective plan view showing an example of a configuration of a print head.
Figure 3B:
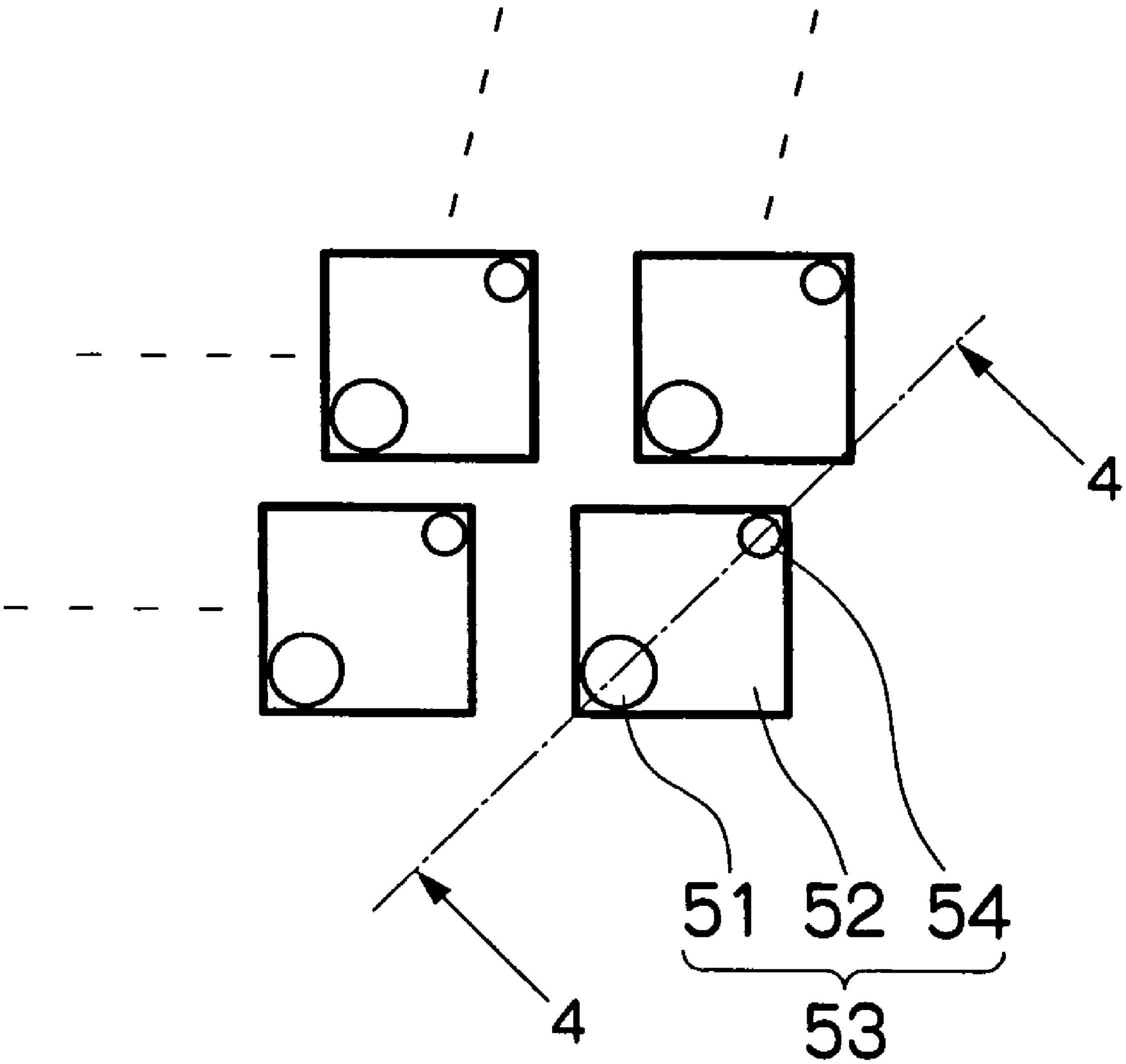
FIG. 3B is a partial enlarged view of FIG. 3A.
Figure 3C:
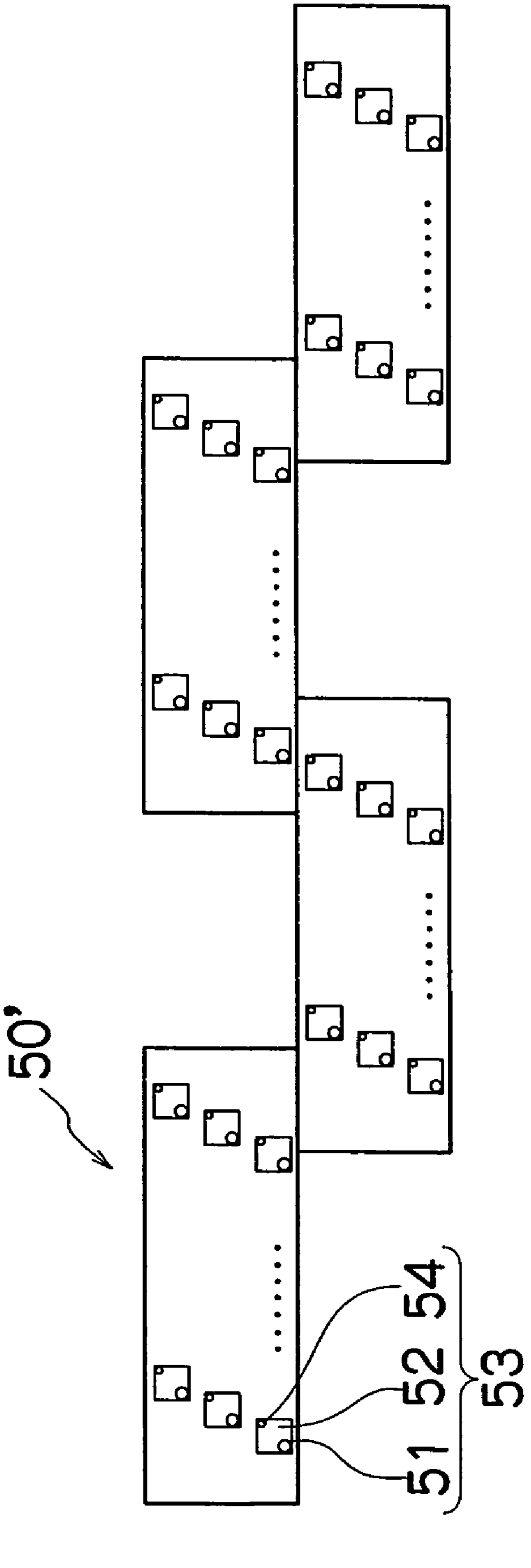
FIG. 3C is a perspective plan view showing another example of the configuration of the print head.
Figure 4:
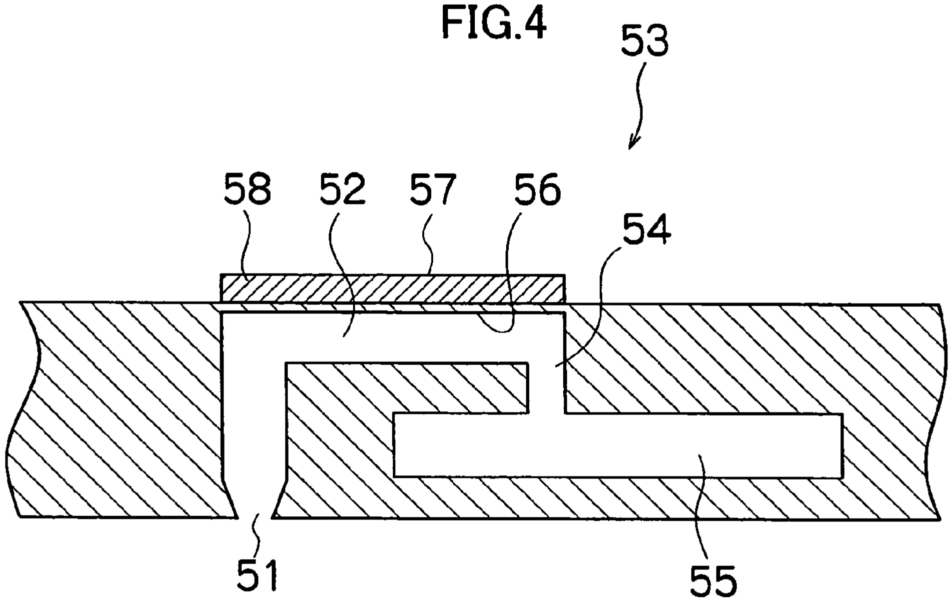
FIG. 4 is a cross-sectional view along a line 4-4 in FIGS. 3A and 3B.

FIG. 3A is a perspective plan view showing an example of the configuration of the print head 50, FIG. 3B is an enlarged view of a portion thereof, FIG. 3C is a perspective plan view showing another example of the configuration of the print head, and FIG. 4 is a cross-sectional view taken along the line 4-4 in FIGS. 3A and 3B, showing the inner structure of an ink chamber unit.

The nozzle pitch in the print head 50 should be minimized in order to maximize the density of the dots printed on the surface of the recording paper. As shown in FIGS. 3A, 3B, 3C and 4, the print head 50 in the present embodiment has a structure in which a plurality of ink chamber units (recording elements) 53 including nozzles 51 for ejecting ink-droplets and pressure chambers (ink chambers) 52 connecting to the nozzles 51 are disposed in the form of a staggered matrix (two-dimensionally), and the effective nozzle pitch is thereby made small.

Thus, as shown in FIGS. 3A and 3B, the print head 50 in the present embodiment is a full-line head in which one or more of nozzle rows in which the ink discharging nozzles 51 are arranged along a length corresponding to the entire width of the recording medium in the direction substantially perpendicular to the conveyance direction of the recording medium.

In the implementation of the present invention, the structure of the nozzle arrangement is not particularly limited to the examples shown in the drawings. Alternatively, as shown in FIG. 3C, a full-line head can be composed of a plurality of short two-dimensionally arrayed head units 50' arranged in the form of a staggered matrix and combined so as to form nozzle rows having lengths that correspond to the entire width of the recording paper 16.

As shown in FIGS. 3A to 3C, the planar shape of the pressure chamber 52 provided for each nozzle 51 is substantially a square, and the nozzle 51 and an inlet of supplied ink (supply port) 54 are disposed in both corners on a diagonal line of the square. As shown in FIG. 4, each pressure chamber 52 is connected to a common channel 55 through the supply port 54. The common channel 55 is connected to an ink supply tank, which is a base tank that supplies ink, and the ink supplied from the ink supply tank is delivered through the common flow channel 55 to the pressure chamber 52.

An actuator 58 having a discrete electrode 57 is joined to a pressure plate 56, which forms the ceiling of the pressure chamber 52, and the actuator 58 is deformed by applying drive voltage to the discrete electrode 57 to eject ink from the nozzle 51. When ink is ejected, new ink is delivered from the common flow channel 55 through the supply port 54 to the pressure chamber 52.

Figure 5:
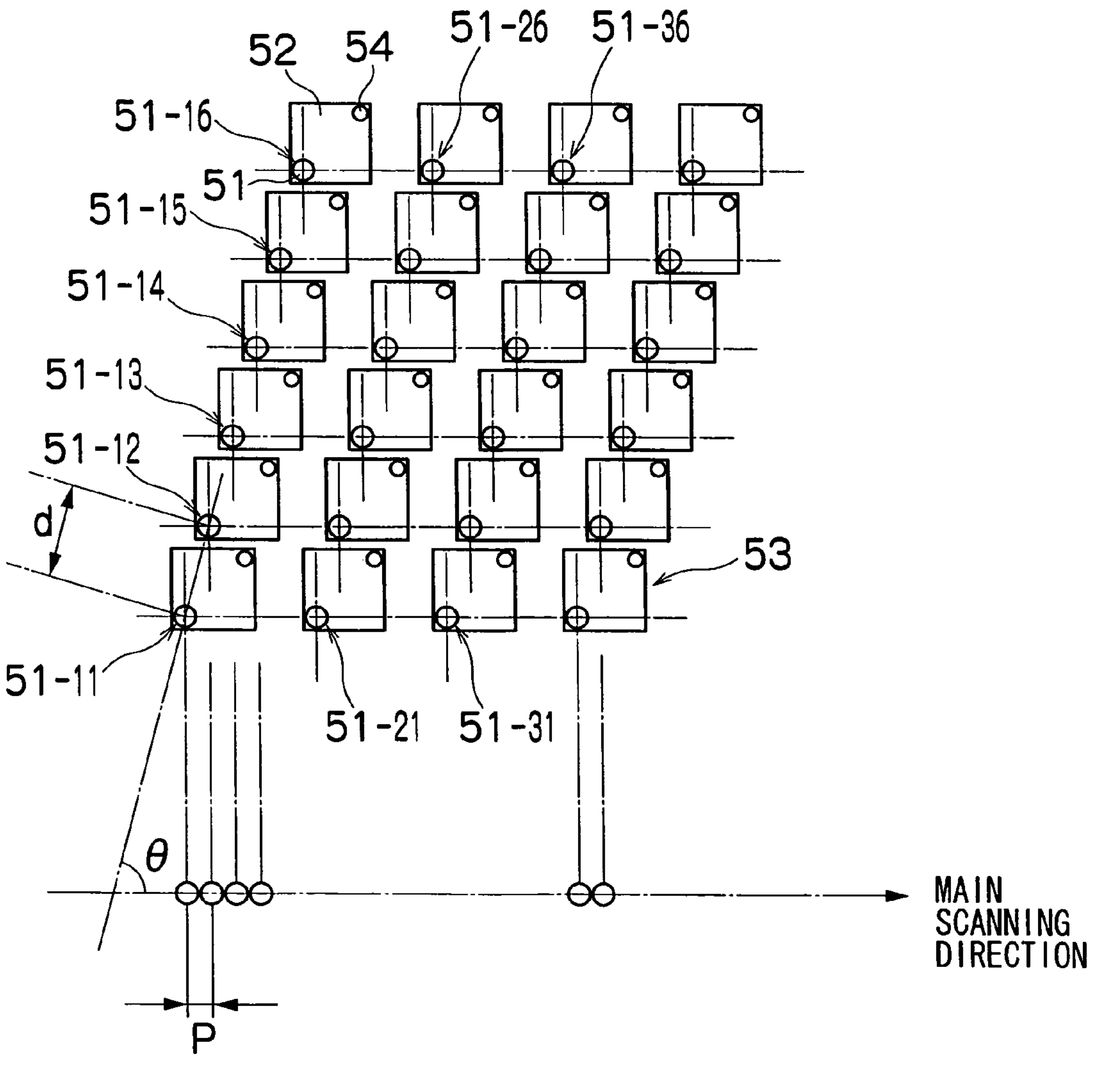
FIG. 5 is an enlarged view showing nozzle arrangement of the print head in FIG. 3A.

The plurality of ink chamber units 53 having such a structure are arranged in a grid with a fixed pattern in the line-printing direction along the main scanning direction and in the diagonal-row direction forming a fixed angle θ that is not a right angle with the main scanning direction, as shown in FIG. 5. With the structure in which the plurality of rows of ink chamber units 53 are arranged at a fixed pitch d in the direction at the angle θ with respect to the main scanning direction, the nozzle pitch P as projected in the main scanning direction is $d \times \cos\theta$.

Hence, the nozzles 51 can be regarded to be equivalent to those arranged at a fixed pitch P on a straight line along the main scanning direction. Such configuration results in a nozzle structure in which the nozzle row projected in the main scanning direction has a high nozzle density of up to 2,400 nozzles per inch (npi). For convenience in description, the structure is described below as one in which the nozzles 51 are arranged at regular intervals (pitch P) in a straight line along the lengthwise direction of the head 50, which is parallel with the main scanning direction.

In a full-line head comprising rows of nozzles that have a length corresponding to the entire width of the paper (the recording paper 16), the "main scanning" is defined as to print one line (a line formed of a row of dots, or a line formed of a plurality of rows of dots) in the width direction of the recording paper (the direction perpendicular to the delivering direction of the recording paper) by driving the nozzles in one of the following ways: (1) simultaneously driving all the nozzles; (2) sequentially driving the nozzles from one side toward the other; and (3) dividing the nozzles into blocks and sequentially driving the blocks of the nozzles from one side toward the other.

In particular, when the nozzles 51 arranged in a matrix such as that shown in FIG. 5 are driven, the main scanning according to the above-described (3) is preferred. More specifically, the nozzles 51-11, 51-12, 51-13, 51-14, 51-15 and 51-16 are treated as a block (additionally; the nozzles 51-21, 51-22, . . . , 51-26 are treated as another block; the nozzles 51-31, 51-32, . . . , 51-36 are treated as another block, . . . ); and one line is printed in the width direction of the recording paper 16 by sequentially driving the nozzles 51-11, 51-12, . . . , 51-16 in accordance with the conveyance velocity of the recording paper 16.

On the other hand, the "sub-scanning" is defined as to repeatedly perform printing of one line (a line formed of a row of dots, or a line formed of a plurality of rows of dots) formed by the main scanning, while moving the full-line head and the recording paper relatively to each other.

According to the above-described matrix structure, an effective projected nozzle pitch in the main scanning direction (the direction along the line head) of approximately 10 to 20 μm is achieved.

Composition of Ink Supply System

Figure 6:
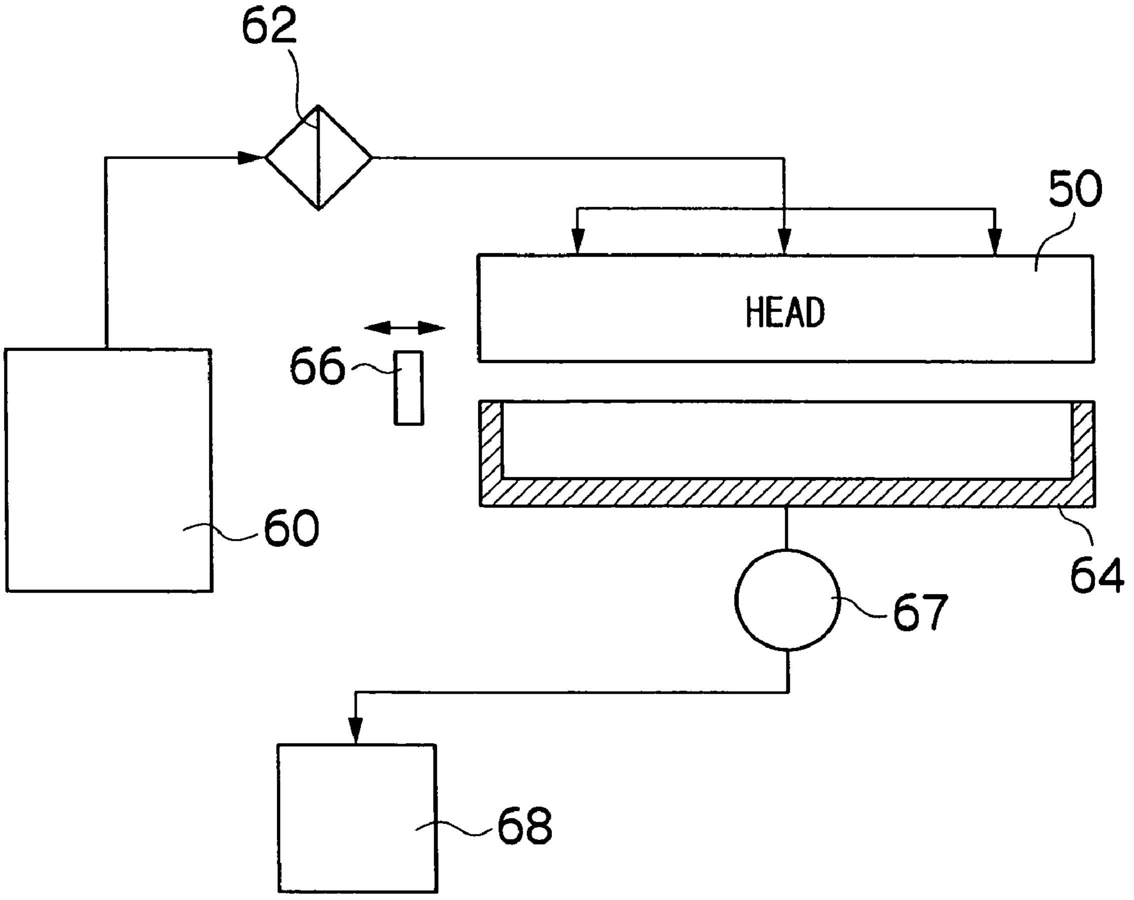
FIG. 6 is a schematic drawing showing a configuration of an ink supply system in the inkjet recording apparatus.

FIG. 6 is a schematic drawing showing the configuration of the ink supply system in the inkjet recording apparatus 10. An ink supply tank 60 is a base tank that supplies ink and is set in the ink storing and loading unit 14 described with reference to FIG. 1. The aspects of the ink supply tank 60 include a refillable type and a cartridge type: when the remaining amount of ink is low, the ink supply tank 60 of the refillable type is filled with ink through a filling port (not shown) and the ink supply tank 60 of the cartridge type is replaced with a new one. In order to change the ink type in accordance with the intended application, the cartridge type is suitable, and it is preferable to represent the ink type information with a bar code or the like on the cartridge, and to perform ejection control in accordance with the ink type. The ink supply tank 60 in FIG. 6 is equivalent to the ink tanks 14Bk, 14LC, 14LM and 14Y in the ink storing and loading unit 14 in FIG. 1 described above.

A filter 62 for removing foreign matters and bubbles is disposed between the ink supply tank 60 and the print head 50 as shown in FIG. 6. The filter mesh size in the filter 62 is preferably equivalent to or less than the diameter of the nozzle and commonly about 20 μm.

Although not shown in FIG. 6, it is preferable to provide a sub-tank integrally to the print head 50 or nearby the print head 50. The sub-tank has a damper function for preventing variation in the internal pressure of the head and a function for improving refilling of the print head.

The inkjet recording apparatus 10 is also provided with a cap 64 as a device to prevent the nozzles 51 from drying out or to prevent an increase in the ink viscosity in the vicinity of the nozzles 51, and a cleaning blade 66 as a device to clean the nozzle face. A maintenance unit including the cap 64 and the cleaning blade 66 can be moved in a relative fashion with respect to the print head 50 by a movement mechanism (not shown), and is moved from a predetermined holding position to a maintenance position below the print head 50 as required.

The cap 64 is displaced up and down in a relative fashion with respect to the print head 50 by an elevator mechanism (not shown). When the power of the inkjet recording apparatus 10 is switched OFF or when in a print standby state, the cap 64 is raised to a predetermined elevated position so as to come into close contact with the print head 50, and the nozzle face is thereby covered with the cap 64.

The cleaning blade 66 is composed of rubber or another elastic member, and can slide on the ink discharge surface (surface of the nozzle plate) of the print head 50 by means of a blade movement mechanism (not shown). When ink droplets or foreign matter has adhered to the nozzle plate, the surface of the nozzle plate is wiped, and the surface of the nozzle plate is cleaned by sliding the cleaning blade 66 on the nozzle plate.

During printing or standby, when the frequency of use of specific nozzles is reduced and ink viscosity increases in the vicinity of the nozzles, a preliminary discharge is made toward the cap 64 to discharge the degraded ink.

Also, when bubbles have become intermixed in the ink inside the print head 50 (inside the pressure chamber), the cap 64 is placed on the print head 50, ink (ink in which bubbles have become intermixed) inside the pressure chamber 52 is removed by suction with a suction pump 67, and the suction-removed ink is sent to a collection tank 68. This suction action entails the suctioning of degraded ink whose viscosity has increased (hardened) when initially loaded into the head, or when service has started after a long period of being stopped.

When a state in which ink is not discharged from the print head 50 continues for a certain amount of time or longer, the ink solvent in the vicinity of the nozzles 51 evaporates and ink viscosity increases. In such a state, ink can no longer be discharged from the nozzle 51 even if the actuator 58 is operated. Before reaching such a state the actuator 58 is operated (in a viscosity range that allows discharge by the operation of the actuator), and the preliminary discharge is made toward the ink receptor to which the ink whose viscosity has increased in the vicinity of the nozzle is to be discharged. After the nozzle surface is cleaned by a wiper such as the cleaning blade 66 provided as the cleaning device for the nozzle face, a preliminary discharge is also carried out in order to prevent the foreign matter from becoming mixed inside the nozzles 51 by the wiper sliding operation. The preliminary discharge is also referred to as “dummy discharge”, “purge”, “liquid discharge”, and so on.

When bubbles have become intermixed in the nozzle 51 or the pressure chamber 52, or when the ink viscosity inside the nozzle 51 has increased over a certain level, ink can no longer be discharged by the preliminary discharge, and a suctioning action is carried out as follows.

More specifically, when bubbles have become intermixed in the ink inside the nozzle 51 and the pressure chamber 52, ink can no longer be discharged from the nozzles even if the actuator 58 is operated. Also, when the ink viscosity inside the nozzle 51 has increased over a certain level, ink can no longer be discharged from the nozzle 51 even if the actuator 58 is operated. In these cases, a suctioning device to remove the ink inside the pressure chamber 52 by suction with a suction pump, or the like, is placed on the nozzle face of the print head 50, and the ink in which bubbles have become intermixed or the ink whose viscosity has increased is removed by suction.

However, this suction action is performed with respect to all the ink in the pressure chamber 52, so that the amount of ink consumption is considerable. Therefore, a preferred aspect is one in which a preliminary discharge is performed when the increase in the viscosity of the ink is small.

The cap 64 described with reference to FIG. 6 serves as the suctioning device and also as the ink receptacle for the preliminary discharge.

Description of Control System

Figure 7:
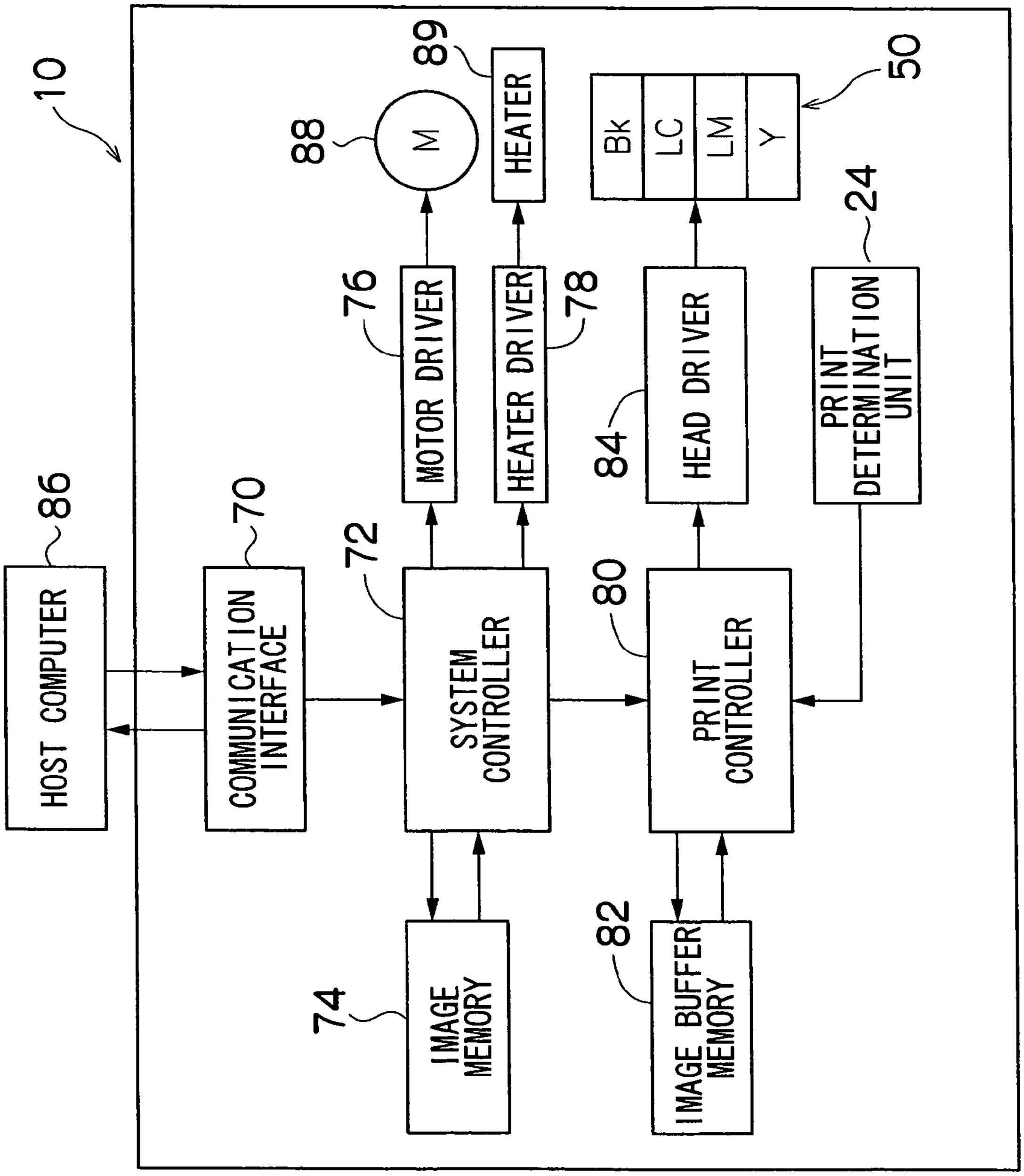
FIG. 7 is a principal block diagram showing the system composition of the inkjet recording apparatus.

FIG. 7 is a block diagram of the principal components showing the system configuration of the inkjet recording apparatus 10. The inkjet recording apparatus 10 has a communication interface 70, a system controller 72, an image memory 74, a motor driver 76, a heater driver 78, a print controller 80, an image buffer memory 82, a head driver 84, and other components.

The communication interface 70 is an interface unit for receiving image data sent from a host computer 86. A serial interface such as USB, IEEE1394, Ethernet, wireless network, or a parallel interface such as a Centronics interface may be used as the communication interface 70. A buffer memory (not shown) may be mounted in this portion in order to increase the communication speed.

The image data sent from the host computer 86 is received by the inkjet recording apparatus 10 through the communication interface 70, and is temporarily stored in the image memory 74. The image memory 74 is a storage device for temporarily storing images inputted through the communication interface 70, and data is written and read to and from the image memory 74 through the system controller 72. The image memory 74 is not limited to memory composed of a semiconductor element, and a hard disk drive or another magnetic medium may be used.

The system controller 72 controls the communication interface 70, image memory 74, motor driver 76, heater driver 78, and other components. The system controller 72 has a central processing unit (CPU), peripheral circuits therefor, and the like. The system controller 72 controls communication between itself and the host computer 86, controls reading and writing from and to the image memory 74, and performs other functions, and also generates control signals for controlling a heater 89 and the motor 88 in the conveyance system.

The motor driver (drive circuit) 76 drives the motor 88 in accordance with commands from the system controller 72. The heater driver (drive circuit) 78 drives the heater 89 of the post-drying unit 42 or the like in accordance with commands from the system controller 72.

The print controller 80 has a signal processing function for performing various tasks, compensations, and other types of processing for generating print control signals from the image data stored in the image memory 74 in accordance with commands from the system controller 72 so as to apply the generated print control signals (image formation data) to the head driver 84.

The print control unit 80 is a control unit having a signal processing function for performing various treatment processes, corrections, and the like, in accordance with the control implemented by the system controller 72, in order to generate a signal for controlling printing, from the image data in the image memory 74, and it supplies the print control signal (image data) thus generated to the head driver 84. Prescribed signal processing is carried out in the print control unit 80, and the discharge amount and the discharge timing of the ink droplets or the protective liquid from the respective print heads 50 are controlled via the head drier 84, on the basis of the image data. By this means, prescribed dot size, dot positions, or coating of protective liquid can be achieved.

The print controller 80 is provided with the image buffer memory 82; and image data, parameters, and other data are temporarily stored in the image buffer memory 82 when image data is processed in the print controller 80. The aspect shown in FIG. 7 is one in which the image buffer memory 82 accompanies the print controller 80; however, the image memory 74 may also serve as the image buffer memory 82. Also possible is an aspect in which the print controller 80 and the system controller 72 are integrated to form a single processor.

The head driver 84 drives actuators for the print heads 50 of the respective colors on the basis of the print data received from the print controller 80. A feedback control system for keeping the drive conditions for the print heads constant may be included in the head driver 84.

The image data to be printed is externally inputted through the communication interface 70, and is stored in the image memory 74. In this stage, the RGB image data is stored in the image memory 74. The image data stored in the image memory 74 is sent to the print controller 80 through the system controller 72, and is converted to the dot data for each ink color by a known dithering algorithm, random dithering algorithm or another technique in the print controller 80.

In other words, the print controller 80 performs a processing for converting the inputted RGB image data to the dot data for the four colors of YCMBk. In the present embodiment, presence of dots is determined according to a dithering algorithm for at least one color ink.

The dot data thus generated by the print controller 80 is stored in the image buffer memory 82.

The head driver 84 acquires the dot data stored in the image buffer memory 82, generates drive control signals for the print head 50 according to the acquired dot data, and applies the drive control signals to the print head 50. The print head 50 ejects ink-droplets according to the drive control signals applied from the head driver 84. An image is formed on the recording paper 16 by controlling the ink-droplet ejection from the print head 50 in synchronization with the conveyance velocity of the recording paper 16.

The print determination unit 24 is a block that includes the line sensor as described above with reference to FIG. 1, reads the image printed on the recording paper 16, determines the print conditions (presence of the ejection, variation in the dot deposition, and the like) by performing desired signal processing, or the like, and provides the determination results of the print conditions to the print controller 80. The read start timing for the line sensor is determined from the distance between the line sensor and the nozzles and the conveyance velocity of the recording paper 16.

The print controller 80 makes various compensation with respect to the print head 50 as required on the basis of the information obtained from the print determination unit 24.

Next, desirable image recording conditions in the inkjet recording apparatus 10 having the composition described above will be explained.

Firstly, the terminology used in the following description will be defined.

The "recording rate" is found by firstly taking the taking the maximum number of dots of ink of a particular color, per unit length in the vertical and lateral directions of the print (this is equal to the general number of pixels, or equivalent to the general recording resolution of the printer), as $m_1$and $m_2$, respectively, and at maximum a total of $N_{max}=m_1 \times m_2$ dots are deposited per unit area. If this maximum number of dots $N_{max}=m_1 \times m_2$per unit area is taken to be 100%, and the number of dots per unit area deposited under certain conditions is taken to be r, then the ratio $r/N_{max}$ is defined as the recording rate (more specifically, the recording rate with respect to the recording resolution of the printer), and this is stated as a percentage (%). The vertical and lateral directions on the print can be set as desired. Although this usage is not applied in the present specification, in some cases, the term "recording rate" is used to mean the operating rate (duty) of the respective nozzles. In the present specification, it is not used in this sense (nozzle operating rate).

"Coverage rate" defines the ratio c/S of the total surface area, c, covered by dots per unit surface area, S, when dots of ink of a particular color are deposited on a print at a certain distribution, and this coverage rate is stated as a percentage (%). In other words, it indicates the ratio of the surface area covered by ink, per unit area.

In general, "the surface area of one dot" is greater than the value of $S/(m_1 \times m_2)$="surface area of one pixel" obtained by dividing the unit area by the maximum number of dots per unit area, $(m_1 \times m_2)$, as stated previously in the definition of the "recording rate", and therefore, at the same recording rate, the coverage rate will differ, depending on whether the dots are mutually overlapping, or are not overlapping.

The reason for setting the surface area of one dot is this way is in order to prevent gaps from occurring between dots when the recording rate is 100%, due to the fact that each dot is generally round in shape.

Furthermore, since "coverage rate" cannot express the overlapping between the dots, the term "overlap rate" is also defined. In other words, if the ink used is transparent (meaning that when ink drops are overlapping, the ink beneath is visible, and if the inks are of the same color, then the result is a darker color), then the print result will differ, depending on the amount of overlap.

Therefore, if dots of ink of a particular color are ejected at a certain distribution onto a print, then the overlap rate is defined as the ratio between the total Ds of the surface area of the respective dots per unit surface area, and the unit surface area S, divided by 1/100 of the coverage rate Ds/(S× coverage rate/100), this overlap rate being expressed as a percentage (%). The coverage rate is given by dividing the total surface area of the ink formed by the dots, Ds, by the surface area covered, namely, "Ds/c", expressed as a percentage.

According to this definition, if there is no overlapping between dots, then the value will be 100%, and if there is a two-layer overlap in all regions, then the value will be 200%. In general, since the "surface area of one dot" is greater than the "surface area of one pixel", the coverage rate is 100% when the recording rate is 100%, and the overlap rate will be the value of "surface area of one dot"/"surface area of one pixel", expressed as a percentage.

Figure 8:
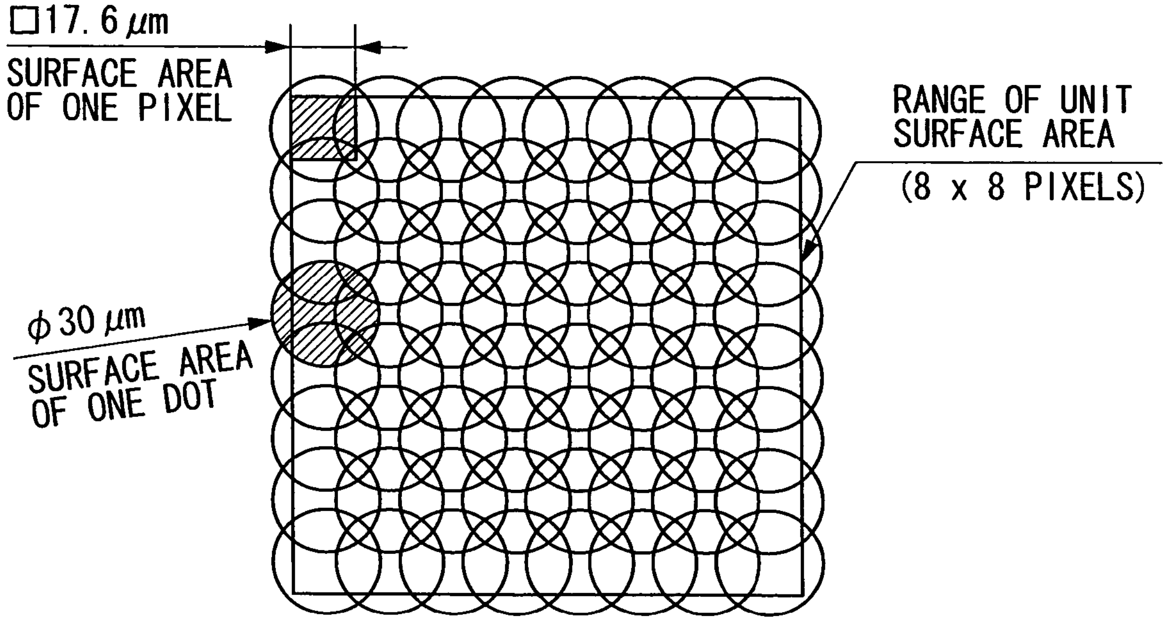
FIG. 8 is a diagram showing an example of a dot arrangement for dots of uniform size, when the recording rate is 100% at a recording resolution of 1440 dpi.

For reference purposes, an example of the dot positions are shown in FIGS. 8 to 10. FIG. 8 is a diagram showing an example of a dot arrangement for dots of uniform size, when the recording rate is 100% at a recording resolution of 1,440 dpi. In this diagram, 8×8 pixels are taken as the range of a unit surface area, and one pixel is 17.6 μm square and one dot is a circle of 30 μm in diameter. As shown in FIG. 8, if the circle of the 8×8(=64) dots extend beyond the range of the unit surface area, then the coverage rate is calculated within the range of the unit surface area only.

Figure 9A:
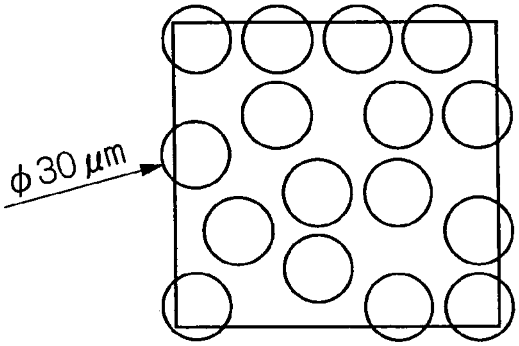
FIGS. 9A and 9B are diagrams showing examples of a dot arrangement for dots of uniform size, when the recording rate is 25% at a recording resolution of 1440 dpi.
Figure 9B:
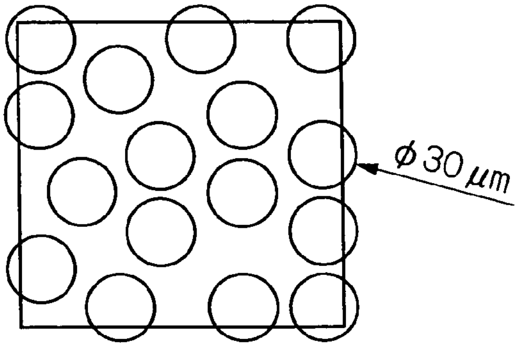

FIGS. 9A and 9B show examples of a dot arrangement for dots of uniform size, when the recording rate is 25% at a recording resolution of 1,440 dpi. In these diagrams, although the arrangement patterns of the dots are different, the number of dots contained in the unit surface area is the same.

Figure 10A:
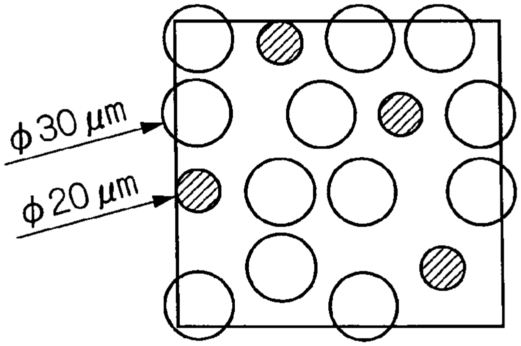
FIGS. 10A and 10B are diagrams showing examples of a dot arrangement for dots of uniform size distribution, when the recording rate is 25% at a recording resolution of 1440 dpi.
Figure 10B:
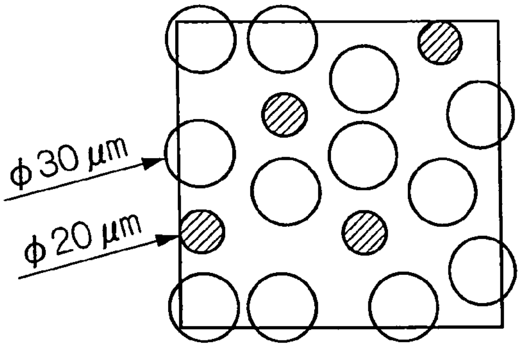

FIGS. 10A and 10B show examples of a dot arrangement for dots of uniform size distribution, when the recording rate is 25% at a recording resolution of 1,440 dpi. In FIGS. 10A and 10B, dots of 30 μm diameter and dots of 20 μm in diameter are mixed together in a uniform ratio.

If there is a case where three or more dots are overlapping in the same portion of the print, then the print result will differ, even if the overlap rate is the same. The print result will also differ, between a case where there is a concentration distribution for the respective dots, and a case where the concentration within the dots is uniform.

The "recording rate", the "coverage rate" and the "overlap rate" can be summarized respectively in the following equations:

$$\text{Recording rate} = (r/N_{\max}) \times 100\ (\%) \quad (1)$$

$$\text{Coverage rate} = (c/S) \times 100\ (\%) \quad (2)$$

$$\text{Overlap rate} = \{Ds/(S \times \text{Coverage rate}/100)\} \times 100\ (\%) = (Ds/c) \times 100\ (\%) \quad (3)$$

Here, r is the number of dots actually ejected per unit surface area, $N_{max}$ is the maximum number of dots ejected per unit surface area, c is the total value of the surface area covered by the dots ejected per unit surface area (the surface area apart from the white background of the printing paper), Ds is the total surface area of the dots ejected per unit surface area, and S is the unit surface area.

Using these definitions, conditions of the following kinds, for example, may be considered for making a simple comparison between ink densities.

(Condition 1) Print densities are compared for the same (or substantially the same) dot size of different inks, at a recording rate of 100% (see FIG. 8).

(Condition 2) Print densities are compared for different inks at the same recording rate with respect to the surface area over which the density is measured (the same total number of dots), at the same (or substantially the same) dot size for each ink, and at an overlap rate of 100% (a case where the respective dots are not mutually overlapping) (see FIGS. 9A and 9B).

(Condition 3) Print densities are compared for different inks at the same recording rate with respect to the surface area over which the density is measured (the same total number of dots), at the same distribution of dot size ejected for each ink, and at an overlap rate of 100% (a case where the respective dots are not mutually overlapping) (see FIGS. 10A and 10B).

Desirably, in order to establish fixed quantities for these complex situations, the ink reflection or transmission density (or the reflectance or transmissivity) for each minimal part of the surface area on the print is integrated over the whole surface area, and the average reflection/transmission density (rate) is calculated.

Desirable Recording Conditions in Inkjet Recording Apparatus 10 According to the Present Embodiment: 1

The inkjet recording apparatus 10 is characterized in that the brightness or perception of graininess are substantially the same for each ink, if the light cyan (LC), light magenta (LM) and yellow (Y: normal concentration) inks respectively have approximately the same dot size, at a recording rate of 100%, or if the respective inks have approximately the same dot size at the same recording rate, and the overlap rate of the respective inks is 100%, or if the size distribution of the dots ejected for each ink is the same, at the same recording rate for each ink with respect to the surface area over which brightness or graininess is to be evaluated, and the overlap rate is 100%.

Here, the range of "if the dot size of the different inks is approximately the same" signifies an error in the average of the dot size of the respective inks of ±15% or less, and desirably, ±10% or less. The brightness and perception of graininess of the respective inks are evaluated under these conditions.

Ink Brightness

In the present specification, the brightness of the ink is defined as "L*" in the "L*a*b*" color specification system, which is a generally used system for representing colors. The details of this definition are described, for example, in "Japanese Standards Association: JIS Handbook (Optics), Color representation methods L*a*b* and L*u*v*, Z8729-1994".

The definition of "L*" extracted from this reference is as follows.

Brightness L* according to the 1976 version of the CIE color system is determined by the following equations, using Y or $Y_{10}$ of the tristimulus values in the XYZ color representation scheme or the $X_{10}Y_{10}Z_{10}$ color representation scheme stipulated in JIS Z8701:

$$\text{If } Y/Y_n > 0.008856, \text{ then } L^* = 116 \cdot (Y/Y_n)^{1/3} - 16, \text{ and}$$

$$\text{If } Y/Y_n < 0.008856, \text{ then } L^* = 903.29 \cdot (Y/Y_n).$$

Here, Y is the value of Y or $Y_{10}$ of the tristimulus values in the XYZ or $X_{10}Y_{10}Z_{10}$ color representation schemes; and $Y_n$ is the value of Y or $Y_{10}$ based on standard reference light from a perfect reflecting diffuser.

Range of Equivalence of Ink Brightness

The ink brightness is the value defined by "L*" described above, and it is found by colorimetric measurement when printing is performed according to the "Conditions 1 to 3" described above, and the range within with this "L*" value can be treated as being "substantially equivalent" is examined below.

In the "L*a*b*" color representation system, all colors are defined by quantifying them in terms of "L*a*b*" with the aim of ensuring that an equal magnitude of difference between any two colors as perceived by a human with the naked eye will be represented by a substantially equal spatial difference between the two colors on the "L*a*b*" scheme.

In other words, using the "L*a*b*" scheme is aimed at quantifying and comparing color differences, the object being to quantify colors in such a manner that these color differences can be compared to a high degree of resolution. More specifically, a difference of 1 to 2 in the spatial distance on the "L*a*b*" scheme, although very slight, is a color difference that is perceivable by the human eye.

Here, in the present embodiment, the aim is to achieve approximately the same perceptibility for "yellow ink" and "light cyan and light magenta ink", and more particularly, approximately the same perception of "roughness" in the dot-shaped ink, and therefore, a situation where there is a slight difference which may or may not be identifiable as a color difference is not defined as being "substantially equivalent".

More specifically, in the present embodiment, from the viewpoint of "roughness", if the difference in the value of "L*" is "15 or less", then it is defined as being "substantially equivalent". In other words, in order for the ink brightness to be substantially equivalent, the difference in the "L*"

value must at least be restricted to 15 or less. Desirably, the difference in "L*" value is 10 or less, and more desirably, the difference in "L*" value is 5 or less.

Perception of Graininess of Ink

The perception of graininess in the ink is defined by the "graininess G" below, on the basis of a Noise Weiner Spectrum (NWS):

$$G = \left|\frac{dL}{dD}\right|\left(\int_0^\infty MTFv(u)^2 NWS(u)\,du\right)^{\frac{1}{2}},$$

where L brightness "L*"

D: general density (in present application, the reflected optical density)

MTFv: MTF of visual system

NWS: Noise Weiner Spectrum u: spatial frequency.

The details of this definition are described in "P. G. Engeldium and G. E. McNeill, Some Experiments on the Perception of Graininess in Black and White Photographic Prints, J. Imag. Sci., 29, 18-23 (1985); 29, 207(1985)".

It is known that the logarithm of the above-defined "graininess G" has a high level of correlation with the subjective evaluation value (results actually evaluated by the naked eye).

Therefore, if the range of the graininess G is stipulated, then the range within which the perception thereof is substantially equivalent will change according to the size of the "graininess G".

In the present embodiment, the range within which the perception of graininess is substantially equivalent is defined as follows:

if an average value of G<5, the range is taken to be a difference in G of 2 or less, and more desirably, 1 or less;

if 5≦an average value of G<10, the range is taken to be a difference in G of 4 or less, and more desirably, 2 or less; and if 10<an average value of G, the range is taken to be a difference in G of 12 or less, and more desirably, 6 or less.

Here, the "average value of G" is the average of the values of G being compared.

Desirable Recording Conditions in Inkjet Recording Apparatus 10 According to the Present Embodiment: 2

The inkjet recording apparatus is composed in such a manner that, when the dot sizes of the respective inks of light cyan (LC), light magenta (LM) and yellow (Y) are approximately the same, at a recording rate of 100%, then the reflection density of respective recordings made by LC and LM ink is lower than the reflection density made by Y ink. Desirably, the reflection density of LC and LM is taken to be 1/n or less of the reflection density of Y (where n≧2). By this means, it is possible to obtain a density equivalent to the Y ink, by ejecting the LC and LM ink repeatedly, n times. Most desirably, a mode is adopted wherein the reflection density of LC and LM is ½ the reflection density of the Y ink. In this case, the number of repeated ejections of LC and LM inks is reduced to a minimum.

Desirable Recording Conditions in Inkjet Recording Apparatus 10 According to the Present Embodiment: 3

A composition is adopted for the inkjet recording head 10 whereby the ink density of the light cyan (LC) ink and the light magenta (LM) ink is lower than the ink density of the yellow ink.

Desirably, the transmission density of LC and LM is taken to be 1/n or less of the transmission density of Y (where n is an integer and n>2). By this means, it is possible to obtain a density equivalent to the Y ink, by ejecting the LC and LM ink repeatedly, n times. Most desirably, a mode is adopted wherein the transmission density of LC and LM inks is ½ the transmission density of the Y ink. In this case, the number of repeated ejections of LC and LM inks is reduced to a minimum.

Desirable Recording Conditions in Inkjet Recording Apparatus 10 According to the Present Embodiment: 4

The inkjet recording apparatus 10 is composed in such a manner that, if respectively separate images are printed using the light cyan (LC), light magenta (LM), or yellow (Y) inks, at a coverage rate of approximately 100%, the respective dots being distributed uniformly in such a manner that the recording rate and the overlap rate are substantially minimum values, then the print density for LC and LM will be 0.9 or less in terms of reflection density, and the print density of Y will be 1.8 or above, in terms of reflection density. If the printed reflection density for Y is less than 1.8, then the image will assume a bleached out appearance, and therefore, in order to achieve high image quality of photographic level, desirably, the printed reflection density for Y should be 1.8 or above. If, for example, the printed reflection density for Y is taken to be 1.8, and the printed reflection density for LC and LM is taken to be ½ of that for Y, then the printed reflection density for LC and LM will be 0.9.

Example of Desirable Recording Control in Inkjet Recording Apparatus 10 According to the Present Embodiment In order to obtain the required density using light inks (LC, LM) in such a manner that the desirable recording conditions 1 to 4 described above are achieved, desirably, a mode is adopted wherein the inkjet recording apparatus 10 has a control function whereby these light inks can be deposited two or more times at substantially the same position.

Furthermore, instead of a control function of this kind, or in conjunction with same, in order to obtain the required density using light inks (LC, LM), desirably, a mode is adopted wherein the inkjet recording apparatus 10 has a control function whereby these light inks can be deposited onto the printed object at positions whereby the dots are overlapping by ½ or more.

Furthermore, desirably, a mode is adopted comprising a control function whereby, before the thin ink previously deposited onto the print object is absorbed, or before this ink has solidified, ink of the same color as that previously deposited is deposited onto a position contacting the thin ink previously deposited.

This is a mode whereby, before the ink deposited onto the recording paper 16 has finished being absorbed into the recording paper 16, the next ink droplet is deposited and the respective ink droplets make contact on the recording paper 16, whereby the two ink droplets are drawn together due to surface tension, and hence the ink can be distributed in a more concentrated fashion, compared to a case where a time interval is left between ejection of ink droplets.

Figures 11A, 11B, 11C:
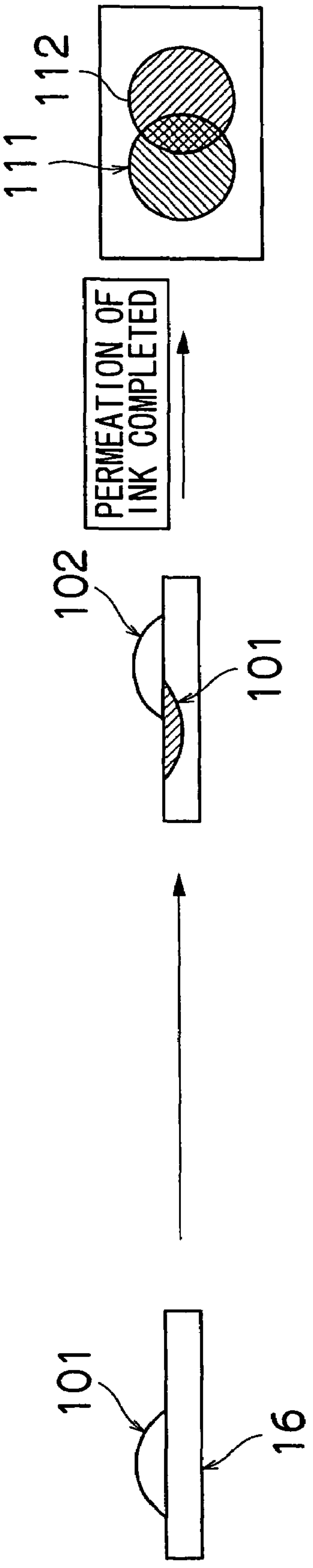
FIGS. 11A to 11C are descriptive diagrams showing a state where a dot is form by means of two ink droplets discharged at different timings (where the time interval between the discharge timings is long)

FIGS. 11A to 11C show a state of this kind. FIGS. 11A to 11C show a case where a long period of time is left between an ink droplet ejected first and an ink droplet ejected subsequently. If there is a long time period, after the ink 101 discharged first has landed on the recording paper 16 (FIG. 1A), until the next ink droplet 102 is ejected, then as shown in FIG. 11B, the next ink 102 will land on the recording paper 16 after the ink 101 relating to the previous discharge has permeated completely into the recording paper 16. In this case, if permeation of the ink 102 has been completed, then two dots 111, 112 will appear in overlapping fashion, as shown in FIG. 11C.

Figure 12A:
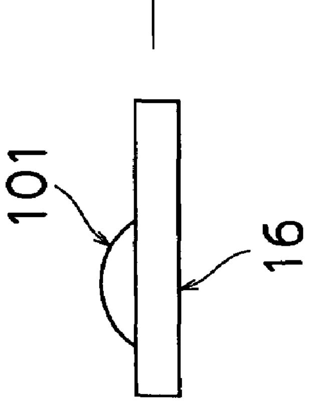
FIGS. 12A to 12C are descriptive diagrams showing a state where a dot is form by means of two ink droplets discharged at different timings (where the time interval between the discharge timings is short).
Figure 12B:
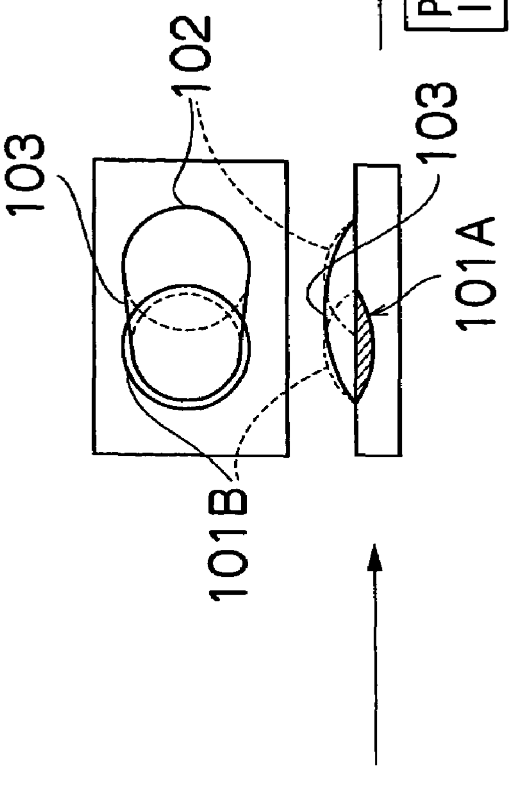
Figure 12C:
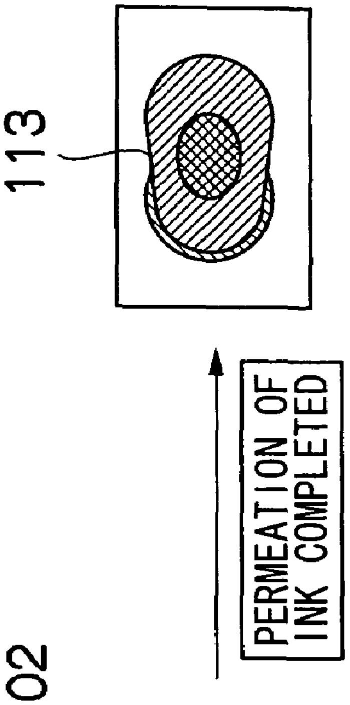

If, on the other hand, the time period between the ink droplet ejected previously and the ink droplet ejected subsequently is short, then as shown in FIGS. 12A to 12C, the next ink droplet 102 will be ejected when a portion 101A of the first ink 101 has permeated into the recording paper 16, and while the remaining portion 101B is still in a liquid state on the recording paper 16 (FIG. 12B).

In this case, the two ink droplets aggregate due to surface tension, and the state 103 wherein the two ink droplets are connected is formed. Thereupon, when the permeation of the ink has completed, a single long, thin dot 113 is formed, as shown in FIG. 12C.

Compared to FIG. 11C, the state in FIG. 12C yields dots where the density is more concentrated towards the center.

The actual appearance varies depending the combination of the type of recording paper 16 used, and the type of ink, and the like, but when using general photographic paper for an inkjet printer, the ink permeates into the paper within several milliseconds to 20 milliseconds, approximately.

As described above, in order to achieve high-density recording by overlapping a plurality of ejected dots of light ink (LC, LM), it is necessary for the discharge frequency of the LC and LM ink to be two or more times the discharge frequency of the Y ink.

Furthermore, since a greater stabilizing effect is obtained, the greater the rapid drying characteristics of the ink, then a mode where UV-curable ink is used in the present embodiment is desirable. Furthermore, from the viewpoint of avoiding staining when a plurality of ink droplets are ejected in overlapping fashion, it is desirable to use a resin dispersion ink or pigment ink, or the like.

The present invention is extremely beneficial when applied to an inkjet recording apparatus having a single pass type head (and especially, a full line head having a recording width equal to the page width), but the present invention can also be applied to a multiple pass type inkjet recording apparatus.

Desirably, when implementing the present invention, the image resolution of the dots of the inks of various colors are the same, but it is also possible to set different image resolutions for each color.

In the embodiments described above, a method is employed wherein an ink droplet is ejected by means of the deformation of an actuator 58, which is, typically, a piezo-electric element (electrical distortion element) provided externally to an ink passage (pressure chamber 52), but in implementing the present invention, the method used for discharging ink is not limited in particular, and instead of a piezo jet method, it is also possible to apply various other types of methods, such as a thermal jet method, wherein an ink droplet is discharged by means of the pressure of an air bubble generated by passing current through a heat generating element such as a heater provided inside the ink passage.

Moreover, in the inkjet recording apparatus 10 relating to the embodiments described above, it is also possible to adopt a composition whereby the ink droplet volume can be changed in the ink of at least one color (a composition which allows modification of the dot size).

Desirably, when discharging ink onto the same position on the printed object, when comparing LC and LM with Y, the LC and LM inks are discharged before the Y ink. By recording the cyan and magenta inks, which have a significant effect on image quality and a high possibility of involving a large ink volume, while there has been little permeation of the ink into the recording paper 16 (while the capacity of the paper to absorb ink is still high), then the ink absorbing capacity of the recording paper 16 can be utilized effectively, and hence a satisfactory image can be formed.

Furthermore, the dot diameter of a dot formed by one discharge of Y ink is greater than the dot diameter of a dot formed by one discharge of another color (LC, LM). In order to achieve the required density by ejecting a plurality of droplets of LC and LM ink, desirably, the ink volume used in one ink ejecting action is set to a smaller value for LC and LM than for Y.

Besides increasing the discharge frequency, the method for achieving the required density by superimposing a plurality of dots may also use a mode wherein the recording paper 16 is moved back and forth, the light inks LC and LM, and Y ink being discharged during the first print travel operation, and the light inks LC and LM being discharged again on the return travel, thereby increasing the ink density on the image. By adopting a method of this kind, it is possible to superimpose a colors, without causing staining. Furthermore, it is also possible for the recording paper 16 to be moved past the head a plurality of times, in the same direction, by means of a belt, drum, or the like, rather than performing a back and forth movement.

In the embodiments described above, an example using LC and LM ink tanks was described, but it is also possible to adopt a composition wherein a C ink tank and an M ink tank of normal density are used, and furthermore, a mechanism or flow passage for introducing a liquid for diluting the ink is provided in the ink flow passage between the ink tanks and the heads for discharging light ink. In this way, a composition can also be achieved wherein ink of low density (light ink) is created by diluting dark ink, when it is to be used.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image forming apparatus which forms an image on a recording medium by using coloring materials of at least three colors of cyan, magenta and yellow, wherein:

at least one of the cyan and magenta color materials is a coloring material of lower density than the yellow; and ink brightness or perception of graininess on the recording medium is substantially the same for each of the three coloring materials, when recording is carried out on the recording medium according to any one condition of: a first condition wherein recording is carried out using substantially the same dot size for each color, at a recording rate of 100%; a second condition wherein recording is carried out using substantially the same dot size for each color, at the same recording rate for each color with respect to the surface area of the recording medium that is to be evaluated, and at an overlap rate of 100%; and a third condition wherein recording is carried out using substantially the same dot size distribution for each color, at the same recording rate for each color with respect to the surface area on the recording medium that is to be evaluated, and at an overlap rate of 100%, where a maximum number of dots recorded onto the recording medium per unit surface area is taken as $N_{max}$, a number of dots actually recorded per unit surface area as r, a sum of a surface area covered by the recorded dots per unit surface area as c, a total surface area of the dots recorded per unit surface area as Ds, and the unit surface area as S, and the following equations are established: a recording rate=$(r/N_{max})\times 100(\%)$, a coverage rate=$(c/S)\times 100(\%)$, and an overlap rate=$\{Ds/(S\times \text{Coverage rate}/100)\}\times 100(\%)=(Ds/c)\times 100(\%)$.

2. The image forming apparatus as defined in claim 1, comprising:

a cyan recording head which has a plurality of cyan recording elements for forming dots of cyan on the recording medium;

a magenta recording head which has a plurality of magenta recording elements for forming dots of magenta on the recording medium;

a yellow recording head which has a plurality of yellow recording elements for forming dots of yellow on the recording medium; and a recording control device which controls recording in such a manner that recording pixels of high density of the same color are formed, by recording a plurality of superimposed dots of the low density, by means of at least one of the recording heads corresponding to the low-density coloring material, of the cyan recording head and the magenta recording head.

3. The image forming apparatus as defined in claim 2, wherein the recording control device has a control function for recording a plurality of dots using the low-density coloring material, at substantially the same position on the recording medium.

4. The image forming apparatus according to claim 2, wherein the recording control device has a control function for recording a plurality of dots using the low-density coloring material, at positions on the recording medium in which the plurality of dots overlap mutually by ½ or more of the dot diameter.

5. The image forming apparatus as defined in claim 2, wherein:

the low-density coloring material is an ink; and the recording control device has a control function for the low-density ink whereby, before an ink droplet previously deposited onto the recording medium has been completely absorbed into the recording medium, or before the ink droplet previously deposited onto the recording medium has completely solidified on the recording medium, a subsequent droplet of ink of the same color is deposited onto a position making contact with a range of a liquid state of the previously deposited ink on the recording medium.

6. The image forming apparatus as defined in claim 2, wherein a drive frequency of the recording elements in at least one recording head corresponding to the low-density coloring material is two or more times a drive frequency of the yellow recording elements.

7. The image forming apparatus as defined in claim 2, wherein the ink used as the coloring material is one of a UV-curable ink, a resin dispersion ink, and a pigment ink.

8. The image forming apparatus as defined in claim 2, further comprising a full line recording head wherein a plurality of recording elements for forming respective dots of cyan, magenta and yellow are arranged through a length corresponding to an entire width of the recording medium.

9. An image forming method for forming an image on a recording medium by using coloring materials of at least three colors of cyan, magenta and yellow, the method comprising the steps of:

using a coloring material of lower density than the yellow for at least one of the cyan and magenta color materials; and making ink brightness or perception of graininess on the recording medium substantially the same for each of the three coloring materials, when recording is carried out on the recording medium according to any one condition of: a first condition wherein recording is carried out using substantially the same dot size for each color, at a recording rate of 100%; a second condition wherein recording is carried out using substantially the same dot size for each color, at the same recording rate for each color with respect to a surface area of the recording medium that is to be evaluated, and at an overlap rate of 100%; and a third condition wherein recording is carried out using substantially the same dot size distribution for each color, at the same recording rate for each color with respect to the surface area of the recording medium that is to be evaluated, and at an overlap rate of 100%, where a maximum number of dots recorded onto the recording medium per unit surface area is taken as $N_{max}$, a number of dots actually recorded per unit surface area as r, a sum of a surface area covered by the recorded dots per unit surface area as c, a total surface area of the dots recorded per unit surface area as Ds, and the unit surface area as S, and the following equations are established: a recording rate=$(r/N_{max})\times 100(\%)$, a coverage rate=$(c/S)\times 100(\%)$, and an overlap rate=$\{Ds/(S\times \text{Coverage rate}/100)\}\times 100(\%)=(Ds/c)\times 100(\%)$.

* * * * *